US008809448B2

(12) United States Patent
Moncla et al.

(10) Patent No.: US 8,809,448 B2
(45) Date of Patent: *Aug. 19, 2014

(54) AQUEOUS POLYMER DISPERSIONS AND PRODUCTS FROM THOSE DISPERSIONS

(71) Applicant: Dow Global Technologies LLC, Midland, MI (US)

(72) Inventors: Brad M. Moncla, Lake Jackson, TX (US); Sarah T. Eckersley, Midland, MI (US); Ralph G. Czerepinksi, Midland, MI (US); Charles F. Diehl, Durango, CO (US); Matthew J. Kalinowski, Freeland, MI (US); Dale C. Schmidt, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/068,538

(22) Filed: Oct. 31, 2013

(65) Prior Publication Data

US 2014/0058034 A1   Feb. 27, 2014

Related U.S. Application Data

(60) Continuation of application No. 13/742,709, filed on Jan. 16, 2013, now Pat. No. 8,618,210, which is a continuation of application No. 13/416,453, filed on May 29, 2012, now Pat. No. 8,383,723, which is a continuation of application No. 13/048,626, filed on Mar. 15, 2011, now Pat. No. 8,163,837, which is a continuation of application No. 12/815,918, filed on Jun. 15, 2010, now Pat. No. 7,935,755, which is a division of application No. 11/068,573, filed on Feb. 28, 2005, now Pat. No. 7,763,676, which is a continuation-in-part of application No. 10/925,693, filed on Aug. 25, 2004, now Pat. No. 7,803,865.

(60) Provisional application No. 60/497,527, filed on Aug. 25, 2003, provisional application No. 60/548,493, filed on Feb. 27, 2004.

(51) Int. Cl.
*B60C 1/00* (2006.01)
*C08F 210/00* (2006.01)

(52) U.S. Cl.
USPC .......................................... 524/570; 526/348

(58) Field of Classification Search
USPC .......................................... 524/570; 526/348
See application file for complete search history.

(56) References Cited

U.S. PATENT DOCUMENTS 3,166,613 A   1/1965   Wright et al.
3,245,934 A   4/1966   Krzyszkowski (Continued)

FOREIGN PATENT DOCUMENTS

DE   4428382   2/1996
EP   0277 003   8/1988

(Continued)

OTHER PUBLICATIONS

Second Chinese Office Action for Chinese Divisional Application No. 201210026205.8, Jan. 27, 2014, 6 pages.

(Continued)

*Primary Examiner* — William Cheung

(57) ABSTRACT

A method for forming a heat sealable coating on a substrate, wherein the substrate is formed from at least one oriented polymer is shown. The method includes depositing an aqueous polymer dispersion on the substrate, wherein the aqueous polymer dispersion includes (A) at least one thermoplastic resin; (B) at least one dispersing agent; and (C) water; wherein the dispersion has a pH of less than 12, and drying the dispersion to form a first layer.

2 Claims, 4 Drawing Sheets

(56) References Cited

U.S. PATENT DOCUMENTS

| | | |
|---|---|---|
| 3,422,049 A | 1/1969 | McClain |
| 3,432,483 A | 3/1969 | Peoples et al. |
| 3,456,044 A | 7/1969 | Pahlke |
| 3,554,994 A | 1/1971 | Maloney et al. |
| 3,590,000 A | 6/1971 | Palermiti et al. |
| 3,645,992 A | 2/1972 | Elston |
| 3,741,253 A | 6/1973 | Brax et al. |
| 3,746,681 A | 7/1973 | McClain |
| 3,908,050 A | 9/1975 | Gor |
| 3,910,840 A | 10/1975 | Adam |
| 4,038,477 A | 7/1977 | Inoue et al. |
| 4,076,698 A | 2/1978 | Anderson et al. |
| 4,340,519 A | 7/1982 | Kotera et al. |
| 4,352,849 A | 10/1982 | Mueller |
| 4,542,199 A | 9/1985 | Kaminsky et al. |
| 4,543,399 A | 9/1985 | Jenkins, III et al. |
| 4,551,380 A | 11/1985 | Schoenberg |
| 4,588,790 A | 5/1986 | Jenkins, III et al. |
| 4,597,920 A | 7/1986 | Golike |
| 4,599,392 A | 7/1986 | McKinney et al. |
| 4,689,351 A | 8/1987 | Endo et al. |
| 4,749,616 A | 6/1988 | Liu et al. |
| 4,752,597 A | 6/1988 | Turner |
| 4,798,081 A | 1/1989 | Hazlitt et al. |
| 4,808,561 A | 2/1989 | Welborn, Jr. |
| 4,818,785 A | 4/1989 | Otawa et al. |
| 4,820,557 A | 4/1989 | Warren |
| 4,837,084 A | 6/1989 | Warren |
| 4,865,902 A | 9/1989 | Golike et al. |
| 4,871,705 A | 10/1989 | Hoel |
| 4,897,455 A | 1/1990 | Welborn, Jr. |
| 4,912,075 A | 3/1990 | Chang |
| 4,927,708 A | 5/1990 | Herran et al. |
| 4,937,217 A | 6/1990 | Chang |
| 4,937,301 A | 6/1990 | Chang |
| 4,952,451 A | 8/1990 | Mueller |
| 4,963,419 A | 10/1990 | Lustig et al. |
| 4,988,781 A | 1/1991 | McKinney et al. |
| 4,996,259 A | 2/1991 | Koehler et al. |
| 5,008,288 A | 4/1991 | Stracher et al. |
| 5,017,714 A | 5/1991 | Welborn, Jr. |
| 5,028,670 A | 7/1991 | Chinh et al. |
| 5,059,481 A | 10/1991 | Lustig et al. |
| 5,086,025 A | 2/1992 | Chang |
| 5,120,867 A | 6/1992 | Welborn, Jr. |
| 5,132,262 A | 7/1992 | Rieger et al. |
| 5,147,949 A | 9/1992 | Chang |
| 5,189,192 A | 2/1993 | LaPointe et al. |
| 5,198,401 A | 3/1993 | Turner et al. |
| 5,228,531 A | 7/1993 | Patterson et al. |
| 5,238,892 A | 8/1993 | Chang |
| 5,243,001 A | 9/1993 | Winter et al. |
| 5,272,236 A | 12/1993 | Lai et al. |
| 5,278,119 A | 1/1994 | Turner et al. |
| 5,278,264 A | 1/1994 | Spaleck et al. |
| 5,278,272 A | 1/1994 | Lai et al. |
| 5,290,654 A | 3/1994 | Sacripante et al. |
| 5,296,434 A | 3/1994 | Karl et al. |
| 5,302,417 A | 4/1994 | Yamauchi et al. |
| 5,304,614 A | 4/1994 | Winter et al. |
| 5,308,734 A | 5/1994 | Sacripante et al. |
| 5,324,800 A | 6/1994 | Welborn, Jr. et al. |
| 5,348,832 A | 9/1994 | Sacripante et al. |
| 5,360,648 A | 11/1994 | Falla et al. |
| 5,364,486 A | 11/1994 | Falla et al. |
| 5,370,963 A | 12/1994 | Patel et al. |
| 5,381,261 A | 1/1995 | Hirai et al. |
| 5,387,568 A | 2/1995 | Ewen et al. |
| 5,391,629 A | 2/1995 | Turner et al. |
| 5,419,960 A | 5/1995 | Touhsaent |
| 5,504,172 A | 4/1996 | Imuta et al. |
| 5,539,021 A | 7/1996 | Pate et al. |
| 5,545,504 A | 8/1996 | Keoshkerian et al. |
| 5,561,092 A | 10/1996 | Ewen et al. |
| 5,574,091 A | 11/1996 | Walther et al. |
| 5,593,807 A | 1/1997 | Sacripante et al. |
| 5,648,193 A | 7/1997 | Patel et al. |
| 5,658,704 A | 8/1997 | Patel et al. |
| 5,660,965 A | 8/1997 | Mychajlowskij et al. |
| 5,667,383 A | 9/1997 | Mendoza et al. |
| 5,717,048 A | 2/1998 | Tsubaki et al. |
| 5,721,025 A | 2/1998 | Falla et al. |
| 5,721,185 A | 2/1998 | LaPointe et al. |
| 5,756,659 A | 5/1998 | Hughes et al. |
| 5,760,112 A | 6/1998 | Hirota et al. |
| 5,798,410 A | 8/1998 | Walther et al. |
| 5,840,462 A | 11/1998 | Foucher et al. |
| 5,844,045 A | 12/1998 | Kolthammer et al. |
| 5,853,944 A | 12/1998 | Foucher et al. |
| 5,869,575 A | 2/1999 | Kolthammer et al. |
| 5,874,139 A | 2/1999 | Bosiers et al. |
| 5,879,768 A | 3/1999 | Falla et al. |
| 5,938,437 A | 8/1999 | DeVincenzo |
| 5,942,579 A | 8/1999 | Falla et al. |
| 6,106,822 A | 8/2000 | Rademacher et al. |
| 6,111,023 A | 8/2000 | Chum et al. |
| 6,117,465 A | 9/2000 | Falla et al. |
| 6,130,266 A | 10/2000 | Mihayashi et al. |
| 6,221,191 B1 | 4/2001 | Davis et al. |
| 6,235,143 B1 | 5/2001 | Crighton et al. |
| 6,316,549 B1 | 11/2001 | Chum et al. |
| 6,326,115 B1 | 12/2001 | Nakanishi et al. |
| 6,339,123 B1 | 1/2002 | Raetzsch et al. |
| 6,359,105 B1 | 3/2002 | Ianni et al. |
| 6,387,581 B1 | 5/2002 | Moffat et al. |
| 6,395,445 B1 | 5/2002 | Toth et al. |
| 6,448,321 B1 | 9/2002 | Tokita et al. |
| 6,448,341 B1 | 9/2002 | Kolthammer et al. |
| 6,448,621 B1 | 9/2002 | Thakur |
| 6,455,636 B2 | 9/2002 | Sanada et al. |
| 6,521,679 B1 | 2/2003 | Okada et al. |
| 6,525,157 B2 | 2/2003 | Cozewith et al. |
| 6,528,574 B1 | 3/2003 | Levy et al. |
| 6,538,070 B1 | 3/2003 | Cardwell et al. |
| 6,566,446 B1 | 5/2003 | Parikh et al. |
| 6,623,866 B2 | 9/2003 | Migliorini et al. |
| 6,767,956 B2 | 7/2004 | Choudhery et al. |
| 6,777,096 B2 | 8/2004 | Shiba et al. |
| 6,818,699 B2 | 11/2004 | Kajimaru et al. |
| 6,887,909 B2 | 5/2005 | Kawamura et al. |
| 6,897,252 B2 | 5/2005 | Arikawa et al. |
| 6,960,635 B2 | 11/2005 | Stevens et al. |
| 7,183,032 B2 | 2/2007 | Hidaka et al. |
| 7,199,202 B2 | 4/2007 | Minami et al. |
| 7,267,858 B2 | 9/2007 | Ono et al. |
| 7,494,757 B2 | 2/2009 | Sacripante et al. |
| 7,498,112 B2 | 3/2009 | Sweeney |
| 7,521,166 B2 | 4/2009 | Sata et al. |
| 7,521,507 B2 | 4/2009 | Lewtas et al. |
| 7,524,599 B2 | 4/2009 | Vanbesien et al. |
| 7,528,218 B2 | 5/2009 | Shirai et al. |
| 7,763,676 B2 | 7/2010 | Moncla et al. |
| 7,803,865 B2 | 9/2010 | Moncla et al. |
| 7,812,062 B2 | 10/2010 | Strandburg et al. |
| 7,824,832 B2 | 11/2010 | Kimura et al. |
| 7,855,258 B2 | 12/2010 | Datta et al. |
| 7,892,714 B2 | 2/2011 | McDougall et al. |
| 7,910,276 B2 | 3/2011 | Moffat et al. |
| 7,935,755 B2 | 5/2011 | Moncla et al. |
| 7,981,582 B2 | 7/2011 | Veregin et al. |
| 8,163,837 B2 | 4/2012 | Moncla et al. |
| 8,198,374 B2 | 6/2012 | Arriola et al. |
| 8,383,723 B2 | 2/2013 | Moncla et al. |
| 2001/0011118 A1 | 8/2001 | Sanada |
| 2002/0146509 A1 | 10/2002 | Kodokian et al. |
| 2002/0198298 A1 | 12/2002 | Arikawa et al. |
| 2003/0157354 A1 | 8/2003 | Van Veghel et al. |
| 2003/0158341 A1 | 8/2003 | Walton |
| 2003/0204017 A1 | 10/2003 | Stevens et al. |
| 2003/0232268 A1 | 12/2003 | Sacripante et al. |
| 2004/0024094 A1 | 2/2004 | Stemmler |
| 2004/0027593 A1 | 2/2004 | Wilkins |
| 2004/0063391 A1 | 4/2004 | Hosaka et al. |
| 2004/0197691 A1 | 10/2004 | Moriyama et al. |

(56) References Cited

U.S. PATENT DOCUMENTS

| | | |
|---|---|---|
| 2004/0242784 A1 | 12/2004 | Tau et al. |
| 2005/0100754 A1 | 5/2005 | Moncla et al. |
| 2005/0271888 A1 | 12/2005 | Moncla et al. |
| 2005/0271965 A1 | 12/2005 | Kamiyoshi et al. |
| 2006/0211781 A1 | 9/2006 | Strandburg et al. |
| 2006/0223934 A1 | 10/2006 | Chen et al. |
| 2007/0088119 A1 | 4/2007 | Kamiyoshi et al. |
| 2007/0212628 A1 | 9/2007 | Ishikawa |
| 2007/0219313 A1 | 9/2007 | Mizuhata et al. |
| 2007/0292705 A1 | 12/2007 | Moncla et al. |
| 2008/0006311 A1 | 1/2008 | Brown et al. |
| 2008/0161487 A1 | 7/2008 | Dorr et al. |
| 2008/0318145 A1 | 12/2008 | Hu et al. |
| 2009/0000791 A1 | 1/2009 | Ice |
| 2009/0011745 A1 | 1/2009 | Cha |
| 2009/0017393 A1 | 1/2009 | Moffat et al. |
| 2009/0047591 A1 | 2/2009 | McDougall et al. |
| 2009/0047593 A1 | 2/2009 | Vanbesien et al. |
| 2009/0061349 A1 | 3/2009 | Sacripante et al. |
| 2009/0092918 A1 | 4/2009 | Moffat |
| 2009/0117482 A1 | 5/2009 | Shirai et al. |
| 2009/0123862 A1 | 5/2009 | Mang et al. |
| 2009/0123863 A1 | 5/2009 | Ashizawa et al. |
| 2009/0123864 A1 | 5/2009 | Sacripante et al. |
| 2009/0123865 A1 | 5/2009 | Sweeney et al. |
| 2009/0156874 A1 | 6/2009 | Patil et al. |
| 2010/0143837 A1 | 6/2010 | Klier et al. |

FOREIGN PATENT DOCUMENTS

| | | | |
|---|---|---|---|
| EP | 0277 004 | | 8/1988 |
| EP | 0573403 | | 12/1993 |
| EP | 0760828 | | 3/1997 |
| EP | 0972 794 | | 1/2000 |
| EP | 1035166 | | 9/2000 |
| JP | 63-092657 | | 4/1988 |
| JP | 02-026631 | | 1/1990 |
| JP | 05-105791 | * | 4/1993 |
| JP | 0593009 | | 4/1993 |
| JP | 08-20636 | | 1/1996 |
| JP | 10-239903 | | 9/1998 |
| JP | 11193340 | | 7/1999 |
| JP | 2000007731 | | 1/2000 |
| JP | 2000198893 | | 7/2000 |
| JP | 2001-106838 | | 4/2001 |
| JP | 2002-047444 | | 2/2002 |
| JP | 2002241439 | | 8/2002 |
| JP | 2008-239691 | | 10/2008 |
| WO | 90/14388 | | 11/1990 |
| WO | WO 90/14388 | * | 11/1990 |
| WO | 92/00333 | | 1/1992 |
| WO | 9523038 | | 8/1995 |
| WO | 02062875 | | 8/2002 |
| WO | 02064856 | | 8/2002 |
| WO | 02081205 | | 10/2002 |
| WO | 02083753 | | 10/2002 |
| WO | 03/025058 | | 3/2003 |
| WO | 03025058 | | 3/2003 |
| WO | 03027170 | | 4/2003 |
| WO | 03093355 | | 11/2003 |
| WO | 2005/021638 | | 3/2005 |
| WO | 2005021622 | | 3/2005 |
| WO | 2005026275 | | 3/2005 |

OTHER PUBLICATIONS

Instructions to Chinese Office Action for Chinese Divisional Application No. 201210026205.8 to associate Mar. 6, 2014, 5 pages.
Response to Second Chinese Office Action for Chinese Divisional Application No. 201210026205.8 filed Mar. 19, 2014, 2 pages.

* cited by examiner

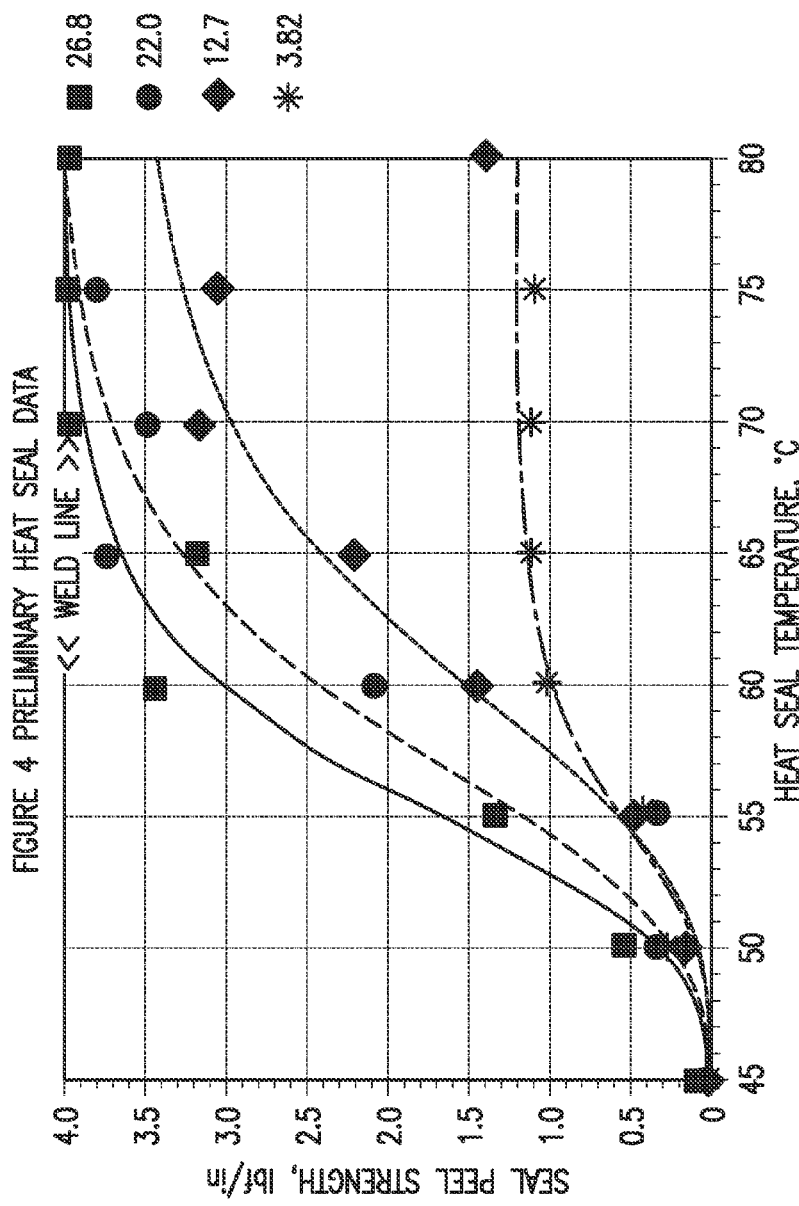

AQUEOUS POLYMER DISPERSIONS AND PRODUCTS FROM THOSE DISPERSIONS

CROSS-REFERENCE TO RELATED APPLICATIONS

This patent application is a continuation of U.S. patent application Ser. No. 13/742,709, filed on Jan. 16, 2013, now U.S. Pat. No. 8,618,210, entitled, "AQUEOUS POLYMER DISPERSIONS AND PRODUCTS FROM THOSE DISPERSIONS,", which is a continuation of U.S. patent application Ser. No. 13/416,453, filed on May 29, 2012, now U.S. Pat. No. 8,383,723, which is a continuation of U.S. patent application Ser. No. 13/048,626, filed on Mar. 15, 2011, now U.S. Pat. No. 8,163,837, which is a continuation application of U.S. patent application Ser. No. 12/815,918, filed on Jun. 15, 2010, now U.S. Pat. No. 7,935,755, which is a divisional application of U.S. patent application Ser. No. 11/068,573, filed on Feb. 28, 2005, now U.S. Pat. No. 7,763,676, which claims the benefit, pursuant to 35 U.S.C. §120 as a continuation in part application of U.S. patent application Ser. No. 10/925,693, filed on Aug. 25, 2004, now U.S. Pat. No. 7,803,865, which claims priority to U.S. Provisional Application Ser. No. 60/497,527, filed on Aug. 25, 2003, and U.S. Provisional Application Ser. No. 60/548,493, filed on Feb. 27, 2004, the teachings of which are incorporated by reference herein, as if reproduced in full hereinbelow.

BACKGROUND OF INVENTION

Aqueous dispersions of a thermoplastic resin of various types are known in the art. Aqueous dispersions have been used in a wide variety of fields since an aqueous dispersion prepared by using water as its dispersion medium is far more advantageous than the dispersions prepared by using an organic solvent for the dispersion medium in view of flammability, working environment, handling convenience, and the like. For example, when an aqueous dispersion is coated and dried on a surface of a substrate such as paper, fiber, wood, metal, or plastic molded article, the resin coating formed will provide the substrate with water resistance, oil resistance, chemical resistance, corrosion resistance and heat sealability.

Conventional aqueous dispersions of a thermoplastic resin have been produced either by a process wherein a polymerizable monomer which is the resin raw material is polymerized by emulsion polymerization in an aqueous medium in the presence of a dispersing agent, or by a process wherein a molten thermoplastic resin and an aqueous medium, and optionally, a dispersing agent are mixed by applying shearing force. The former process is associated with the disadvantage of the limited number of the polymerizable monomers that can be used, and hence, the variety of the aqueous dispersions of the thermoplastic resin that can be produced, is limited. The former process also suffers from complicated control of the polymerization reaction as well as intricate equipment. On the other hand, the latter process is applicable to a wide variety of resins in relatively simple equipment.

One particular application for coatings made from dispersions is in packaging and storage container applications. To be useful, a balance of performance properties such as low heat seal initiation temperature, a high hot tack strength, a broad hot sealing window, good interlayer adhesion, and a high softening point is desirable.

The commercial importance of balanced sealant properties is well understood. That is, low heat seal initiation temperatures are important for improved sealing speeds and reduced energy utilization. A broad sealing window is important for insuring package integrity, sealing equipment flexibility and low package leakage rates.

Good interlayer adhesion is also important for good package integrity as well as good package or container aesthetics. High softening points or temperatures are desired where goods are packaged at elevated temperatures such as in hot-fill applications. Traditionally, when attempting to achieve balanced sealant properties, enhancement of one particular resin property has required some sacrifice with respect to another important property.

For instance, with ethylene alpha-olefin polymers, low heat seal initiation temperatures are typically achieved by increasing the comonomer content of the resin. Conversely, high Vicat softening points and low levels of n-hexane extractives are typically achieved by decreasing the comonomer content of the resin. Accordingly, lowering the heat seal initiation temperature typically results in proportionally reduced Vicat softening temperature and proportionally increased extractable level. U.S. Pat. No. 5,874,139, which is assigned to the assignee of the present invention and is expressly incorporated by reference in its entirety, provides a general discussion of polyolefins in packaging applications.

Several important multilayer packaging and storage structures consist of a polypropylene layer, particularly, a biaxially oriented polypropylene homopolymer (BOPP) base or core layer. Often, BOPP structures utilize polypropylene copolymers and terpolymers as sealant materials (and/or adhesive layers) to insure good interlayer adhesion to the BOPP base layer. While polypropylene copolymers and terpolymers do indeed provide good interlayer adhesion to BOPP base layers as well as good heat seal strength performance, these copolymers and terpolymers sometimes exhibit undesirably high heat seal initiation temperatures.

Other materials have also been used as sealant materials for multilayer packaging and storage structures. However, in general, known sealant materials do not provide the desired overall property balance and/or process flexibility desired by converters and packagers.

SUMMARY OF INVENTION

In one aspect the invention provides an aqueous dispersion comprising (A) at least one thermoplastic resin; (B) at least one dispersing agent; and (C) water; wherein the dispersion has a pH of less than 12. In another aspect the invention provides an aqueous dispersion comprising (A) at least one thermoplastic resin; (B) at least one dispersing agent; and (C) water wherein the dispersion has a volume average particle size of less than about 5 μm. In some dispersions according to either aspect, the dispersing agent comprises less than about 4 percent by weight based on the weight of the thermoplastic resin. In some dispersions having a pH of 12 or less, the dispersion also has a volume average particle size of less than about 5 μm. Some dispersions that have a particle size of less than about 5 μm also have a pH of less than 12. In still other embodiments, the dispersion has a pH of less than 12, and an average particle size of less than about 5 μm, and wherein the dispersing agent comprises less than about 4 percent by weight based on the weight of the thermoplastic resin.

In some dispersions the thermoplastic resin is an alpha-olefin interpolymer of ethylene with at least one comonomer selected from the group consisting of a $C_4$-$C_{20}$ linear, branched or cyclic diene, or an ethylene vinyl compound, such as vinyl acetate, and a compound represented by the formula $H_2C=CHR$ wherein R is a $C_1$-$C_{20}$ linear, branched or cyclic alkyl group or a $C_6$-$C_{20}$ aryl group. Preferred comonomers include propylene, 1-butene, 3-methyl-1-butene, 4-methyl-1-pentene, 3-methyl-1-pentene, 1-heptene, 1-hexene, 1-octene, 1-decene, and 1-dodecene. In some embodiments, the interpolymer of ethylene has a density of less than about 0.92 g/cc.

In other embodiments, the thermoplastic resin comprises an alpha-olefin interpolymer of propylene with at least one comonomer selected from the group consisting of ethylene, a $C_4$-$C_{20}$ linear, branched or cyclic diene, and a compound represented by the formula $H_2C=CHR$ wherein R is a $C_1$-$C_{20}$ linear, branched or cyclic alkyl group or a $C_6$-$C_{20}$ aryl group. Preferred comonomers include ethylene, 1-butene, 3-methyl-1-butene, 4-methyl-1-pentene, 3-methyl-1-pentene, 1-heptene, 1-hexene, 1-octene, 1-decene, and 1-dodecene. In some embodiments, the comonomer is present at about 5% by weight to about 25% by weight of the interpolymer. In some embodiments, a propylene-ethylene interpolymer is preferred.

Some interpolymers of propylene that are useful in particular embodiments are propylene-rich alpha-olefin interpolymer comprising 5 to 25% by weight of ethylene-derived units and 95 to 75% by weight of propylene-derived units. In some embodiments, propylene rich alpha-olefin interpolymers having (a) a melting point of less than 90° C.; a relationship of elasticity to 500% tensile modulus such that the elasticity is less than or equal to 0.935M+12, where elasticity is in percent and M is the 500% tensile modulus in MPa; and a relationship of flexural modulus to 500% tensile modulus such that flexural modulus is less than or equal to $4.2e^{0.27M}+50$, where flexural modulus is in MPa and M is the 500% tensile modulus in MPa are preferred. In some embodiments, the propylene rich alpha-olefin interpolymer comprises 6 to 20% by weight of ethylene-derived units and 94 to 80% by weight of propylene-derived units. In other embodiments, polymers comprising 8 to 20% by weight of ethylene-derived units and 92 to 80% by weight of propylene-derived units are preferred. In still other embodiments, polymers comprising 10 to 20% by weight of ethylene-derived units and 90 to 80% by weight of propylene-derived units.

In other embodiments, a propylene-rich alpha-olefin interpolymer that comprises a copolymer of propylene and at least one comonomer selected from the group consisting of ethylene and $C_4$ to $C_{20}$ alpha-olefins, wherein the copolymer has a propylene content of greater than 65 mole percent, a weight average molecular weight (Mw) of from about 15,000 to about 200,000, a weight average molecular weight/number average molecular weight ratio (Mw/Mn) of from about 1.5 to about 4 is preferred.

Some propylene-rich alpha-olefin interpolymers have a heat of fusion of less than about 80 J/g, preferably from about 8 to about 80, or from about 8 to about 30 J/g as determined by DSC.

In some embodiments, the at least one thermoplastic resin has a crystallinity of less than about 50%. In other embodiments, the crystallinity ranges from about 5% to about 45%, or from about 5% to about 40%.

Any suitable dispersing agent can be used. However, in particular embodiments, the dispersing agent comprises at least one carboxylic acid, a salt of at least one carboxylic acid, or carboxylic acid ester or salt of the carboxylic acid ester. One example of a carboxylic acid useful as a dispersant is a fatty acid such as montanic acid. In some preferred embodiments, the carboxylic acid, the salt of the carboxylic acid, or at least one carboxylic acid fragment of the carboxylic acid ester or at least one carboxylic acid fragment of the salt of the carboxylic acid ester has fewer than 25 carbon atoms. In other embodiments, the carboxylic acid, the salt of the carboxylic acid, or at least one carboxylic acid fragment of the carboxylic acid ester or at least one carboxylic acid fragment of the salt of the carboxylic acid ester has 12 to 25 carbon atoms. In some embodiments, carboxylic acids, salts of the carboxylic acid, at least one carboxylic acid fragment of the carboxylic acid ester or its salt has 15 to 25 carbon atoms are preferred. In other embodiments, the number of carbon atoms is 25 to 60. Some preferred salts comprise a cation selected from the group consisting of an alkali metal cation, alkaline earth metal cation, or ammonium or alkyl ammonium cation.

In still other embodiments, the dispersing agent is selected from the group consisting of ethylene carboxylic acid polymers, and their salts, such as ethylene acrylic acid copolymers or ethylene methacrylic acid copolymers.

In other embodiments, the dispersing agent is selected from alkyl ether carboxylates, petroleum sulfonates, sulfonated polyoxyethylenated alcohol, sulfated or phosphated polyoxyethylenated alcohols, polymeric ethylene oxide/propylene oxide/ethylene oxide dispersing agents, primary and secondary alcohol ethoxylates, alkyl glycosides and alkyl glycerides.

Combinations of any of the above-enumerated dispersing agents can also be used to prepared some aqueous dispersions.

Some dispersions described herein have an advantageous particle size distribution. In particular embodiments, the dispersion has a particle size distribution defined as volume average particle diameter (Dv) divided by number average particle diameter (Dn) of less than or equal to about 2.0. In other embodiments, the dispersion has a particle size distribution of less than or equal to about 1.5.

Some dispersions described herein comprise particles having an average particle size of less than about 1.5 μm. In other embodiments, the average particle size ranges from about 0.05 μm to about 1.5 μm. In still other embodiments, the average particle size of the dispersion ranges from about 0.5 μm to about 1.5 μm.

For dispersions having a pH of less than 12, some dispersions have a pH of from about 5 to about 11.5, preferably from about 7 to about 11, more preferably from about 9 to about 11. The pH can be controlled by a number of factors, including type or strength of base (dispersing agent), degree of conversion of the base to the salt form, type of thermoplastic polymer to be dispersed, and melt kneading (e.g., extruder) processing conditions. The pH can be adjusted either in-situ, or by converting the carboxylic acid dispersing agent to the salt form before adding it to the thermoplastic resin and forming the dispersion. Of these, forming the salt in-situ is preferred.

Preferably, the dispersions are characterized by a percent solids content of less than about 74% by volume. Some dispersions have a percent solids of from about 5% to about 74% by volume. Still other dispersions have a percent solids of less than about 70% by volume, less than about 65% by volume, or from about 5% to about 50% by volume.

In another aspect, embodiments of the invention provide a method for producing an aqueous dispersion comprising: (1) melt kneading (A) at least one thermoplastic resin and (B) at least one dispersing agent, to produce a melt-kneaded product and (2) diluting said melt-kneaded product, and melt kneading the resulting mixture to form the aqueous dispersion, wherein the dispersion has an average particle size of less than about 5 μm. Other embodiments provide a method for producing an aqueous dispersion comprising: (1) melt kneading (A) at least one thermoplastic resin, and (B) at least one dispersing agent, to produce a melt-kneaded product, and (2) diluting said melt-kneaded product, and melt kneading the resulting mixture to form the aqueous dispersion to produce a dispersion having a pH of less than 12. In some methods according to either aspect, the dispersing agent comprises less than about 4 percent by weight based on the weight of the thermoplastic resin. In some methods that provide a dispersion having a pH of 12 or less, the dispersion also has a volume average particle size of less than about 5 µm. Some dispersions that have a particle size of less than about 5 µm also have a pH of less than 12. Embodiments of the methods use the thermoplastic resins and dispersing agents described above. And in some embodiments, the methods provide dispersions having one or more of the properties described above.

In another aspect, embodiments of the invention provide an aqueous dispersion comprising (A) at least one propylene-rich alpha-olefin interpolymer; (B) at least one dispersing agent; and (C) water. On preferred alpha-olefin is ethylene, preferably present in an amount of from about 5% to about 25% by weight. In some embodiments of the invention according to this aspect the propylene-rich alpha-olefin interpolymer is characterized as having an isotactic triad (mm) measured by $^{13}$C NMR of greater than about 0.85. Some such propylene-rich alpha-olefin interpolymer comprise 5 to 25% by weight of ethylene-derived units and 95 to 75% by weight of propylene-derived units. Additionally, some propylene-rich alpha-olefin interpolymers have (a) a melting point of less than 90° C.; (b) a relationship of elasticity to 500% tensile modulus such that the elasticity is less than or equal to 0.935M+12, where elasticity is in percent and M is the 500% tensile modulus in MPa; and (c) a relationship of flexural modulus to 500% tensile modulus such that flexural modulus is less than or equal to $4.2e^{0.27M}+50$, where flexural modulus is in MPa and M is the 500% tensile modulus in MPa. In some embodiments, the propylene rich alpha-olefin interpolymer comprises 6 to 20% by weight of ethylene-derived units and 94 to 80% by weight of propylene-derived units. In other embodiments, polymers comprising 8 to 20% by weight of ethylene-derived units and 92 to 80% by weight of propylene-derived units are preferred. In still other embodiments, polymers comprising 10 to 20% by weight of ethylene-derived units and 90 to 80% by weight of propylene-derived units.

In other embodiments, a propylene-rich alpha-olefin interpolymer that comprises a copolymer of propylene and at least one comonomer selected from the group consisting of ethylene and $C_4$ to $C_{20}$ alpha-olefins, wherein the copolymer has a propylene content of greater than 65 mole percent, a weight average molecular weight (Mw) of from about 15,000 to about 200,000, a weight average molecular weight/number average molecular weight ratio (Mw/Mn) of from about 1.5 to about 4.

Some thermoplastic resins or propylene-rich alpha-olefin interpolymers used in this aspect have a heat of fusion of less than about 80 J/g, preferably from about 8 to about 80, or more preferably from about 8 to about 30 J/g as determined by DSC.

In some embodiments, the propylene-rich alpha-olefin interpolymer has a crystallinity of less than about 50%. In other embodiments, the crystallinity ranges from about 5% to about 45%, or from about 5% to about 40%.

In still other embodiments, the propylene-rich interpolymer has a flexural modulus, measured in accordance with ASTM D-790-97, of less than about 50 kpsi, preferably less than about 40 kpsi, more preferably less than about 30 kpsi. In some dispersions, polymers having lower value for the flexural modulus are preferred. For example, some polymers have a flexural modulus of about 2 to about 15 kpsi, particularly about 4 to about 10 kpsi.

Propylene-rich interpolymers or thermoplastic resins with a melting point of less than about 140° C., preferably less than about 130° C., more preferably less than about 120° C. are used. In some preferred embodiments, the propylene-rich interpolymer or thermoplastic resin has a melting point of less than about 90° C.

Any suitable dispersing agent can be used in embodiments of this aspect of the invention. However, in particular embodiments, the dispersing agent comprises at least one carboxylic acid, a salt of at least one carboxylic acid, carboxylic acid ester or salt of a carboxylic acid ester. In some preferred embodiments, the carboxylic acid, the salt of the carboxylic acid, at least one carboxylic acid fragment of the carboxylic acid ester or its salt has fewer than 25 carbon atoms. In other embodiments, such moieties have 12 to 25 carbon atoms. In some embodiments, 15 to 25 carbon atoms are preferred. In other embodiments, the dispersing agent comprises at least one carboxylic acid, the salt of the at least one carboxylic acid, at least one carboxylic acid fragment of the carboxylic acid ester or its salt that has 25 to 60 carbon atoms. Some preferred salts comprises a cation selected from the group consisting of an alkali metal cation, alkaline earth metal cation, or ammonium or alkyl ammonium cation.

In still other embodiments, the dispersing agent is selected from the group consisting of ethylene acid polymers such as ethylene acrylic acid copolymers or ethylene methacrylic acid copolymers.

In other embodiments, the dispersing agent is selected from alkyl ether carboxylates, petroleum sulfonates, sulfonated polyoxyethylenated alcohol, sulfated or phosphated polyoxyethylenated alcohols, polymeric ethylene oxide/propylene oxide/ethylene oxide dispersing agents, primary and secondary alcohol ethoxylates, alkyl glycosides and alkyl glycerides.

Combinations of any of the above-enumerated dispersing agents can also be used to prepared some aqueous dispersions.

Some dispersions described herein have an advantageous particle size distribution. In particular embodiments, the dispersion has a particle size distribution defined as volume average particle diameter (Dv) divided by number average particle diameter (Dn) of less than or equal to about 2.0. In other embodiments, the dispersion has a particle size distribution of less than or equal to about 1.5.

Some dispersions described herein comprise particles having a volume average particle size of less than about 1.5 µm. In other embodiments, the average particle size ranges from about 0.05 µm to about 1.5 µm. In still other embodiments, the average particle size of the dispersion ranges from about 0.5 µm to about 1.5 µm.

For dispersions having a pH of less than 12, some dispersions have a pH of from about 5 to about 11.5, preferably from about 7 to about 11, more preferably from about 9 to about 11.

Preferably, the dispersions are characterized by a percent solids content of less than about 74% by volume. Some dispersions have a percent solids of from about 5% to about 74% by volume. Still other dispersions have a percent solids of less than about 70% by volume, less than about 65% by volume, or from about 5% to about 50% by volume.

In another aspect, embodiments of the invention provide a method for producing an aqueous dispersion comprising: (1) melt kneading (A) at least one at least one propylene-rich alpha-olefin interpolymer, (B) at least one dispersing agent, to form a melt-kneaded product; and (2) diluting said melt-kneaded product, and melt kneading the resulting mixture to form the aqueous dispersion. In particular embodiments, the method includes diluting the melt kneaded product to provide a dispersion having a pH of less than 12. Some methods provide a dispersion with an average particle size of less than about 5 µm. In still other embodiments, the method provides a dispersion that comprises less than 4 percent by weight of the dispersing agent based on the weight of the polymer. Embodiments of the methods use the thermoplastic resins and dispersing agents described above. And in some embodiments, the methods provide dispersions having on or more of the properties described above.

In still another aspect embodiments of the invention provide an aqueous dispersion comprising (A) at least one thermoplastic resin; (B) at least one dispersing agent; and (C) water; wherein the thermoplastic resin comprises a propylene-rich alpha-olefin interpolymer comprising 5 to 25% by weight of ethylene-derived units and 95 to 75% by weight of propylene-derived units, the copolymer having: (a) a melting point of less than 90° C.; (b) a relationship of elasticity to 500% tensile modulus such that the elasticity is less than or equal to 0.935M+12, where elasticity is in percent and M is the 500% tensile modulus in MPa; and (c) a relationship of flexural modulus to 500% tensile modulus such that flexural modulus is less than or equal to $4.2e^{0.27M}+50$, where flexural modulus is in MPa and M is the 500% tensile modulus in MPa.

In another aspect of the invention, some dispersions are suitable for making various articles. Some such articles include coatings, foams and froths as well as decorative articles.

In one aspect, the present invention relates to a method for forming a heat sealable coating on a substrate, wherein the substrate is formed from at least one oriented polymer. In select embodiments, the method includes depositing an aqueous polymer dispersion on the substrate, wherein the aqueous polymer dispersion includes (A) at least one thermoplastic resin; (B) at least one dispersing agent; and (C) water; wherein the dispersion has a pH of less than 12, and drying the dispersion to form a first layer.

In one aspect, the present invention relates to a film layer that includes a substrate, the substrate including an oriented polymer, having a coating, wherein the coating was obtained from an aqueous dispersion comprising (A) at least one thermoplastic resin; (B) at least one dispersing agent; and (C) water; wherein the dispersion had a pH of less than 12.

In one aspect, the present invention relates to a film layer including a substrate, the substrate including an oriented polymer, having a coating, wherein the coating was obtained from an aqueous dispersion comprising (A) at least one thermoplastic resin; (B) at least one dispersing agent; and (C) water; wherein the dispersion had an average volume diameter particle size of less than about 5 µm.

In one aspect, the present invention relates to an article including a substrate, the substrate including an oriented polymer, having a coating, wherein the coating was obtained from an aqueous dispersion comprising (A) at least one thermoplastic resin; (B) at least one dispersing agent; and (C) water; wherein the dispersion had an average volume diameter particle size of less than about 5 µm.

In one aspect, the present invention relates to an article including a substrate, the substrate including an oriented polymer, having a coating, wherein the coating was obtained from an aqueous dispersion comprising (A) at least one thermoplastic resin; (B) at least one dispersing agent; and (C) water; wherein the dispersion had a pH of less than 12.

In one aspect, the present invention relates to a method for forming a heat sealable coating on a substrate including coating a substrate, with an aqueous polymer dispersion, wherein the aqueous polymer dispersion comprises (A) at least one thermoplastic resin; (B) at least one dispersing agent; and (C) water; wherein the dispersion has a pH of less than 12; and orienting the substrate to form an oriented thermoplastic polymer.

In one aspect, the present invention relates to a film layer including a substrate, having a coating, wherein the film layer is characterized as having a heat seal initiation temperature of less than 80° C., and wherein the coating thickness is less than 2 microns.

Other aspects and advantages of the invention will be apparent from the following description and the appended claims.

BRIEF DESCRIPTION OF DRAWINGS

FIG. 4 shows a graph of heat seal data.

DETAILED DESCRIPTION

Figure 1:
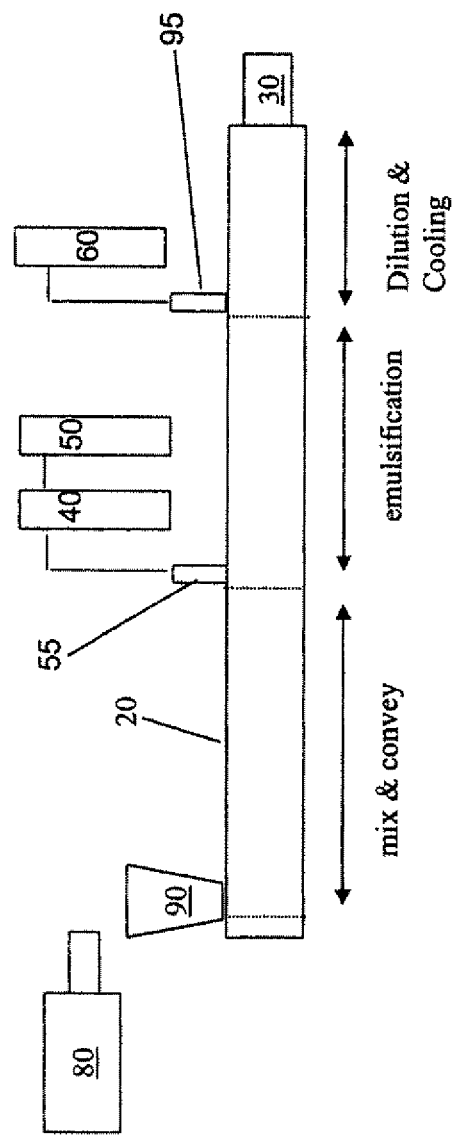
FIG. 1 is a schematic representation of a typical melt-extrusion apparatus used to prepare embodiments of the invention.

In the following description, all numbers disclosed herein are approximate values, regardless whether the word "about" or "approximate" is used in connection therewith. They may vary by 1%, 2%, 5%, and sometimes, 10 to 20%. Whenever a numerical range with a lower limit, $R_L$ and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1% to 100% with a 1% increment, i.e., k is 1%, 2%, 3%, 4%, 5%, ..., 50%, 51%, 52%, ..., 95%, 96%, 97%, 98%, 99%, or 100%. Moreover, any numerical range defined by two R numbers as defined in the above is also specifically disclosed.

Embodiments of the invention relate to the dispersions outlined above and discussed in detail below. In addition, the present invention also relates to films and other products formed from such dispersions. In particular embodiments of the invention, dispersions made according to the methods discussed herein are applied to a substrate (which may be a polymer film) to form a heat sealable layer. In specific embodiments, dispersions may be applied to a polypropylene substrate, which, in some embodiments may be biaxially oriented polypropylene.

Methods of the invention include applying an aqueous dispersion to an oriented substrate, either before or after the substrate has been oriented. In other words, a method in accordance with one preferred embodiment of the present invention includes depositing an aqueous dispersion on an oriented substrate, and drying the dispersion to form a heat sealable layer.

In another embodiment, a method includes a depositing a coating on an unoriented substrate and then orienting the substrate. In this case, the coating may be dried either before or after the orientation of the substrate.

In addition, the present inventors have discovered that by using dispersions made with particular polyolefin polymers (which may be single component polymer, or polymer blends), a heat sealable layer may be formed that has a heat seal initiation temperature of 80° C. or below. In other embodiments, the heat seal initiation temperature may be 75° C. or below. In other embodiments, the heat seal initiation temperature may be 70° C. or below. In other embodiments, the heat seal initiation temperature may be 65° C. or below.

The thermoplastic resin (A) included in embodiments of the aqueous dispersion of the present invention is a resin that is not readily dispersible in water by itself. In some embodiments it is present in the dispersion in an amount of from greater than 0 percent by wt. to less than about 96 percent by wt. In certain embodiments, the resin is present in an amount of from about 35 to about 65 percent by wt. of the dispersion. The term "resin" used herein should be construed to include synthetic polymers or chemically modified natural resins such as but not limited to thermoplastic materials such as polyvinyl chloride, polystyrene, and polyethylene and thermosetting materials such as polyesters, epoxies, and silicones that are used with fillers, stabilizers, pigments, and other components to form plastics. The term resin as used herein includes elastomers and is understood to include blends of olefin polymers. In some embodiments, the thermoplastic resin is a semicrystalline resin. The term "semi-crystalline" is intended to identify those resins that possess at least one endotherm when subjected to standard differential scanning calorimetry (DSC) evaluation. Some semi-crystalline polymers exhibit a DSC endotherm that exhibits a relatively gentle slope as the scanning temperature is increased past the final endotherm maximum. This reflects a polymer of broad melting range rather than a polymer having what is generally considered to be a sharp melting point. Some polymers useful in the dispersions of the invention have a single melting point while other polymers have more than one melting point. In some polymers one or more of the melting points may be sharp such that all or a portion of the polymer melts over a fairly narrow temperature range, such as a few degrees centigrade. In other embodiments, the polymer may exhibit broad melting characteristics over a range of about 20° C. In yet other embodiments, the polymer may exhibit broad melting characteristics over a range of greater than 50° C.

Examples of the thermoplastic resin (A) which may be used in the present invention include homopolymers and copolymers (including elastomers) of an alpha-olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene as typically represented by ethylene-butadiene copolymer and ethylene-ethylidene norbornene copolymer; and polyolefins (including elastomers) such as copolymers of two or more alpha-olefins with a conjugated or non-conjugated diene as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like. These resins may be used either alone or in combinations of two or more.

In particular embodiments, polyolefins such as polypropylene, polyethylene, and copolymers thereof and blends thereof, as well as ethylene-propylene-diene terpolymers. In some embodiments, preferred olefinic polymers include homogeneous polymers described in U.S. Pat. No. 3,645,992 by Elston; high density polyethylene (HDPE) as described in U.S. Pat. No. 4,076,698 to Anderson; heterogeneously branched linear low density polyethylene (LLDPE); heterogeneously branched ultra low linear density (ULDPE); homogeneously branched, linear ethylene/alpha-olefin copolymers; homogeneously branched, substantially linear ethylene/alpha-olefin polymers which can be prepared, for example, by a process disclosed in U.S. Pat. Nos. 5,272,236 and 5,278,272, the disclosure of which process is incorporated herein by reference; and high pressure, free radical polymerized ethylene polymers and copolymers such as low density polyethylene (LDPE), ethylene-acrylic acid (EAA) and Ethylene-methacrylic acid copolymers such as for example those available under the tradenames PRIMACOR™, Nucrel™, and Escor™ and described in U.S. Pat. Nos. 4,599,392, 4,988,781, and 59384373, each of which is incorporated herein by reference in its entirety, and ethylene-vinyl acetate (EVA) copolymers. Polymer compositions described in U.S. Pat. No. 6,538,070, 6,566,446, 5,869,575, 6,448,341, 5,677,383, 6,316,549, 6,111,023, or 5,844,045, each of which is incorporated herein by reference in its entirety, are also suitable in some embodiments. Of course, blends of polymers can be used as well. In some embodiments the blends include two different Ziegler-Natta polymers. In other embodiments, the blends can include blends of a Ziegler-Natta and a metallocene polymer. In still other embodiments, the thermoplastic resin used herein is a blend of two different metallocene polymers.

In some particular embodiments, the thermoplastic resin is a propylene-based copolymer or interpolymer. In some embodiments the propylene/ethylene copolymer or interpolymer is characterized as having substantially isotactic propylene sequences The term "substantially isotactic propylene sequences" and similar terms mean that the sequences have an isotactic triad (mm) measured by 13C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}C$ NMR spectra. NMR spectra are determined as described below. Preferably, when the aqueous dispersions comprise a propylene/ethylene interpolymer, the ethylene is present in an amount of from about 5% to about 25% (by weight).

$^{13}C$ NMR spectroscopy is one of a number of techniques known in the art of measuring comonomer incorporation into a polymer and measuring isotactic triad levels in propylene-based copolymers. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)). The basic procedure for determining the comonomer content of an olefin interpolymer involves obtaining the $^{13}C$ NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole % comonomer can be determined by the ratio of the integrals corresponding to the number of moles of comonomer to the integrals corresponding to the number of moles of all of the monomers in the interpolymer, as described in Randall, for example.

The data is collected using a Varian UNITY Plus 400 MHz NMR spectrometer, corresponding to a $^{13}C$ resonance frequency of 100.4 MHz. Acquisition parameters are selected to ensure quantitative $^{13}C$ data acquisition in the presence of the relaxation agent. The data is acquired using gated 1H decoupling, 4000 transients per data file, a 7 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun.

Preferably, the propylene/ethylene interpolymer has a crystallinity of less than about 50% and a flexural modulus, measured in accordance with ASTM D-790-97, of less than about 50 kpsi, preferably less than about 40 kpsi, and especially less than about 30 kpsi. Preferably, the propylene/ethylene interpolymer has a melting point of less than about 140° C., preferably less than about 130° C., more preferably less than about 120° C., especially less than about 90° C. The propylene/ethylene interpolymers used in the dispersions also preferably have a heat of fusion of less than 80 J/gm, more preferably less than about 75 J/gm, more preferably less than about 50 J/gm, and can be as low as about 8 J/gm, or as low as 4 J/gm.

In some preferred dispersions, the propylene-based copolymer comprises a propylene-ethylene copolymer made using a nonmetallocene, metal-centered, heteroaryl ligand catalyst as described in U.S. Published Patent Application No. 20030204017 filed May 5, 2002, which is incorporated by reference herein in its entirety for its teachings regarding such catalysts. The propylene-ethylene copolymers made with such nonmetallocene, metal-centered, heteroaryl ligand catalyst exhibit a unique regio-error. The regio-error is identified by $^{13}C$ NMR peaks corresponding at about 14.6 and about 15.7 ppm, which are believed to be the result of stereo-selective 2,1-insertion errors of propylene units into the growing polymer chain. In this particularly preferred aspect, these peaks are of about equal intensity, and they typically represent about 0.02 to about 7 mole percent of the propylene insertions into the homopolymer or copolymer chain.

In some aspects of the invention, the propylene-based copolymer has a molecular weight distribution (MWD), defined as weight average molecular weight divided by number average molecular weight (Mw/Mn) of about 4 or less, and can be as low as about 1.5.

Molecular weight distribution of the polymers is determined using gel permeation chromatography (GPC) on a Polymer Laboratories PL-GPC-220 high temperature chromatographic unit equipped with four linear mixed bed columns (Polymer Laboratories (20-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol. The flow rate is 1.0 milliliter/minute and the injection size is 100 microliters. About 0.2% by weight solutions of the samples are prepared for injection by dissolving the sample in nitrogen purged 1,2,4-trichlorobenzene containing 200 ppm 2,6-di-t-butyl-4-methylphenol for 2.5 hrs at 160° C. with gentle mixing.

The molecular weight determination is deduced by using ten narrow molecular weight distribution polystyrene standards (from Polymer Laboratories, EasiCal PS1 ranging from 580-7,500,000 g/mole) in conjunction with their elution volumes. The equivalent propylene-ethylene copolymer molecular weights are determined by using appropriate Mark-Houwink coefficients for polypropylene (as described by Th. G. Scholte, N. L. J. Meijerink, H. M. Schoffeleers, and A.M.G. Brands, J. Appl. Polym. Sci., 29, 3763-3782 (1984)) and polystyrene (as described by E. P. Otocka, R. J. Roe, N.Y. Hellman, P. M. Muglia, Macromolecules, 4, 507 (1971)) in the Mark-Houwink equation:

$$\{N\}=KMa$$

where Kpp=1.90E-04, app=0.725 and Kps=1.26E-04, aps=0.702.

In one embodiment of the invention, the thermoplastic resins utilized in the invention are characterized by a DSC curve with a Tme that remains essentially the same and a Tmax that decreases as the amount of unsaturated comonomer in the copolymer is increased. Tme means the temperature at which the melting ends and Tmax means the peak melting temperature, both as determined by one of ordinary skill in the art from DSC analysis using data from the final heating step. For such polymers, DSC analysis can be determined using a model Q1000 DSC from TA Instruments, Inc., which is calibrated using indium and deionized water.

In some other embodiments, thermoplastic polymer compositions disclosed in U.S. Pat. No. 6,525,157, incorporated by reference in its entirety. The polymers described therein comprise a majority of propylene with a minor amount of ethylene. These polymer compositions include a linear, single homogeneous macromolecular copolymer structure. These polymers have limited crystallinity due to adjacent isotactic propylene units and have a melting point as described below. They are generally devoid of any substantial intermolecular heterogeneity in tacticity and comonomer composition, and are substantially free of diene. They are also devoid of any substantial heterogeneity in intramolecular composition distribution.

In some embodiments of the dispersions described herein, the copolymer includes from a lower limit of 5% or 6% or 8% or 10% by weight ethylene-derived units to an upper limit of 20% or 25% by weight ethylene-derived units. These embodiments also will include propylene-derived units present in the copolymer in the range of from a lower limit of 75% or 80% by weight to an upper limit of 95% or 94% or 92% or 90% by weight. These percentages by weight are based on the total weight of the propylene and ethylene-derived units; i.e., based on the sum of weight percent propylene-derived units and weight percent ethylene-derived units being 100%. Within these ranges, these copolymers are mildly crystalline as measured by differential scanning calorimetry (DSC), and exhibit elasticity. Elasticity, as defined in detail hereinbelow, is a dimensional recovery from elongation for these copolymers.

In embodiments of our invention, a thermoplastic resin is included having a weight average molecular weight (Mw) of from 15,000-5,000,000, or from 20,000 to 1,000,000 and a molecular weight distribution Mw/Mn (sometimes referred to as a "polydispersity index" (PDI)) ranging from a lower limit of 1.01, 1.5 or 1.8 to an upper limit of 40 or 20 or 10 or 5 or 3. In other embodiments the Mw may range from 10,000 to 300,000, or from 100,000 to 250,000.

Another measure of molecular weight typically used for polyethylene polymers is the melt index of the polymer, also called $I_2$. The melt index is indirectly proportional to the molecular weight, although the relationship is not linear. For polyethylene the melt index is measured according to ASTM D-1238, condition 190 deg C./2.16 kg). Typical thermoplastic resins useful in embodiments of the invention have an $I_2$ in the range of from 0.001 to 1000 g/10 min. In some embodiments, the thermoplastic resin (A) has an $I_2$ of from 0.5 to 500 g/10 min. Other embodiments include a thermoplastic resin with an $I_2$ of from 1 to 300 g/10 min. The selection of suitable $I_2$ for the thermoplastic resin should be selected in view of the ease of melt kneadability and physical properties of the coating formed.

Melt flow rate (MFR) is another way of measuring the molecular weight of polypropylene polymers. Like melt index, MFR is indirectly proportional to the molecular weight, although the relationship is not linear. MFR is typically measured according to ASTM D-1238, condition 230° deg C./2.16 kg). Typical thermoplastic resins useful in embodiments of the invention have an MFR less than about 250 g/10 min. In some embodiments, the thermoplastic resin (A) has an MFR of from about 1 to about 200 g/10 min. Other embodiments include a thermoplastic resin with an MFR of from 5 to 100 g/10 min Melting Point and Crystallinity Differential scanning calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., Thermal Characterization of Polymeric Materials, Academic Press, 1981). For example, DSC analysis may be determined using a model Q1000 DSC from TA Instruments, Inc, which is calibrated using indium and deionized water. After heating the sample rapidly to 230 C and holding for 3 minutes, the cooling curve is obtained by cooling at 10 C/min to −40 C. After holding at −40 C for 3 minutes, the DSC melting endotherm is recorded while heating at 10 C/min. The melting point is determined using the standard TA DSC software.

These propylene-rich polymers can be made by a number of processes, such as by single stage, steady state, polymerization conducted in a well-mixed continuous feed polymerization reactor. In addition to solution polymerization, other polymerization procedures such as gas phase or slurry polymerization may be used. Other details suitable processes for preparing such polymers are described in U.S. Pat. No. 6,525,157, incorporated by reference in its entirety.

A typical isotactic polymerization process consists of a polymerization in the presence of a catalyst including a bis (cyclopentadienyl) metal compound and either (1) a non-coordinating compatible anion activator, or (2) an alumoxane activator. According to one embodiment of the invention, this process comprises the steps of contacting ethylene and propylene with a catalyst in a suitable polymerization diluent, the catalyst including, in one embodiment, a chiral metallocene compound, e.g., a bis(cyclopentadienyl) metal compound as described in U.S. Pat. No. 5,198,401, and an activator. U.S. Pat. No. 5,391,629 also describes catalysts useful to produce the some copolymers suitable in dispersions described herein. Gas phase polymerization processes are described in U.S. Pat. Nos. 4,543,399, 4,588,790, 5028670, for example. Methods of supporting metallocene catalysts useful for making some copolymers used embodiments of the invention are described in U.S. Pat. Nos. 4,808,561, 4,897,455, 4,937,301, 4,937,217, 4,912,075, 5,008,228, 5,086,025, 5,147,949, and 5,238,892. Numerous examples of the biscyclopentadienyl metallocenes described above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614. Descriptions of ionic catalysts for coordination polymerization including metallocene cations activated by non-coordinating anions appear in the early work in EP-A-0 277 003, EP-A-0 277 004, U.S. Pat. Nos. 5,198,401 and 5,278,119, and WO 92/00333. The use of ionizing ionic compounds not containing an active proton but capable of producing both the active metallocene cation and a non-coordinating anion is also known. See, EP-A-0 426 637, EP-A-0 573 403 and U.S. Pat. No. 5,387,568, EP-A-0 427 697 and EP-A-0 520 732. Ionic catalysts for addition polymerization can also be prepared by oxidation of the metal centers of transition metal compounds by anionic precursors containing metallic oxidizing groups along with the anion groups; see EP-A-0 495 375.

Some polymers can be prepared by a polymerization process comprising: reacting propylene and at least one comonomer selected from the group consisting of ethylene and at least one $C_4$ to $C_{20}$ alpha-olefin, under polymerization conditions in the presence of a metallocene catalyst capable of incorporating the propylene sequences into isotactic or syndiotactic orientations, in at least one reactor to produce a first copolymer having at least 65 mole % propylene and wherein preferably at least 40% of the propylene sequences are in isotactic or syndiotactic orientations; wherein the copolymer has a melt index (MI) from about 7 dg/min to about 3000 dg/min. Some details of the polymers are described in the following paragraphs.

Preferably, a substantial portion of the propylene-rich polymer or polymer blend melts within 40 to 120° C. One of ordinary skill in the art will appreciate that initiation of melt may begin at lower temperatures. Also, the polymer or polymer blend preferably includes ethylene (or an alpha olefin, e.g., having from 4-20 carbon atoms) in the amount of up to 30 mole %, preferably from 3 mole % to 20 mole % and more preferably from 7 mole % to 15 mole wt %. In this context, the ethylene or alpha olefin can be units forming part of a random semicrystalline copolymer that includes both propylene units and ethylene units, e.g., when a single copolymer is used (not a blend). Alternatively, a blend can be used in which isotactic polypropylene is blended with a polyethylene, in which case the ethylene units in the polyethylene should be up to 30 mole % of the overall polymer blend.

In other specific embodiments, the dispersions include a propylene-rich polymer or polymer blends wherein the composition preferably includes a random copolymer produced by copolymerizing propylene and at least one of ethylene or alpha-olefin having 20 or less carbon atoms, preferably 8 or less carbon atoms, the random copolymer having a crystallinity at least about 2% and no greater than about 65% derived from stereoregular polypropylene sequences and a melting point of from about 25° C. to about 105° C.

In still other specific embodiments, the propylene-rich copolymers are the reaction product of a free radical initiator and a random copolymer produced by copolymerizing propylene and at least one of ethylene or alpha-olefin having 8 or less carbon atoms, the random copolymer having a crystallinity at least about 2% and no greater than about 65% derived from stereoregular polypropylene sequences and a melting point of from about 25° C. to about 105° C.

In yet another specific embodiment of this invention the dispersion includes a random polymer with a melting point between about 40° C. and 140° C. The viscosity as measured by melt flow rate at 230° C. should be between 2 and 5600, more preferably between 70 and 370, and most preferably between 300 and 1800. Correspondingly, the melt index, measured at 190° C., should be between 20 and 1500, more preferably between 40 and 1000, and most preferably between 100 and 500. Further, the tensile elongation of the polymer at room temperature should be in excess of 50%, more preferably in excess of 100%, and most preferably in excess of 300%. Preferably, the random copolymer is a low molecular weight copolymer containing propylene units in an amount of 80% or above, preferably more than 90%, with the propylene units preferably being predominantly isotactic sequences (more than 80% of the units being isotactic pentads), as measured by $^{13}$C NMR. The random copolymers can have long chain branching, providing greater flexibility for desired rheological properties.

Still other dispersions can include a polyolefin composition containing a physical blend, wherein an ethylene-propylene copolymer is blended together with isotactic polypropylene. Those ethylene-propylene copolymers are preferably derived by solution polymerization using chiral metallocene catalysts. Those ethylene-propylene copolymers preferably have crystallinity derived from isotactic propylene sequences. In those blend compositions, the composition of the copolymers includes up to 30 wt % and preferably up to 20 wt % ethylene. Those copolymers may be linear or branched. Those blends preferably contain substantial amounts of isotactic polypropylene, at least about 5 to 10 wt %. In a specific embodiment, the blend can include isotactic polypropylene in an amount up to about 50 wt %, or alternatively up to about 80 wt %. The blend can also include other olefin-based polymers, such as reactor copolymers and impact copolymers. Desirably, the use of the blends described above provide for favorable melting temperatures due to the presence of the isotactic polypropylene while providing a separate molecular architecture for the copolymer, thus improving the rheology, elasticity and flexibility of the adhesive composition.

In still other embodiments, some dispersions include a thermoplastic resin selected from copolymers and interpolymers of ethylene and/or propylene and other monomers selected from $C_4$ to $C_{10}$ olefins, preferably alpha-olefins, more preferably from $C_4$ to $C_8$ alpha-olefins and most preferably selected from n-butene, n-hexene and n-octene. The ethylene or propylene content of the thermoplastic resin ranges from about 2-98 wt. percent of the resin.

In some embodiments, a primarily ethylene-based polyolefin is selected in which ethylene comprises from about 98 to 65 percent of polymer. In other embodiments, a primarily propylene-based polyolefin may be selected, propylene comprising from about 98 to 65 percent of the Polymer. Selected comonomer(s) make up the remainder of the polymer.

In some such embodiments, the ethylene polymer has the following characteristics and properties: 1) Crystallinity as determined by the observance of at least one endotherm when subjected to standard differential scanning calorimetry (DSC) evaluation; 2) a melt index of between about 30 and about 0.1 g/10 min, preferably of between 25 and 0.25 g/10 min, more preferably of between 22 and 0.5 g/10 min and most preferably of between 18 and 0.75 g/10 min; and 3) a density as determined according to ASTM D-792 of between about 0.845 and about 0.925 g/cc, preferably between 0.85 10 and 0.91 g/cc, and more preferably between 0.855 and 0.905 g/cc, and most preferably between 0.86 and 0.90 g/cc.

One class of resins particularly suited to use in embodiments of the invention are copolymers of ethylene and 1-octene or 1-butene, where ethylene comprises from about 90 to about 50, more preferably 85 to 55, and 1-octene or 1-butene from about 10 to about 50, more preferably about 15 to 45 percent by weight of the copolymer, and that have Melt Index of between about 0.25 and about 30, more preferably between 0.5 and 20 g/10 min. Alternatively, instead of a single Polymer a blend of polymers may be employed that has the physical characteristics described above. For example, it may be desirable to blend a first polymer with relatively high MI that is outside the range described above, with another of relatively low MI, so that the combined MI and the averaged density of the blend fall within the ranges noted above.

In addition to the thermoplastic resin, dispersions described herein include a dispersing agent. Any dispersing agent may be used in embodiments of the invention. As used herein the term "dispersing agent" means an agent that aids in the formation and/or the stabilization of an dispersion. Some dispersing agents can also be used to form emulsions and are described in detail by Paul Becher (Emulsions: Theory and Practice, 3rd edition, Oxford University Press, New York, 2001), incorporated herein by reference in its entirety. Dispersing agents generally fall into three classes 1) surface-active materials, 2) naturally occurring materials, 3) finely divided solids. Surface-active agents, also called surfactants, are materials that reduce the interfacial tension between two immiscible liquid phases. They are classified according to the hydrophilic group in the molecule: anionic, cationic, nonionic, or ampholytic (amphoteric). Examples of commercially available dispersing agents is found in McCutcheon (McCutcheon's Emulsifiers and Detergents, Glen Rock, N.J., issued annually). Examples of naturally occurring materials include phospholipids, sterols, lanolin, water-soluble gums, alginates, carageenin, and cellulose derivatives. Examples of finely divided solids include basic salts of the metals, carbon black, powdered silica, and various clay (principally bentonite).

In some embodiments, a carboxylic acid or carboxylic acid salt is used as the dispersing agent. Typical salts include an alkali metal salt or an alkaline earth metal salts of the fatty acid. Other salts include ammonium or alkyl ammonium salts of the carboxylic acid. In some embodiments, the carboxylic acid or it's salt with 12 to fewer than 25 carbon atoms. Where the dispersing agent is a salt, the number of carbons refers to the carbon atoms associated with the carboxylic acid fragment. In other embodiments, the salt is formed with a fatty acid fragment that has at from 15 to 25 carbon atoms. Particular embodiments use an alkali metal salt of erucic acid. Erucic acid is a carboxylic acid with 22 carbon atoms. Some embodiments use erucic acid in the form of rapeseed oil which is a natural oil that contains approximately 40 to about 50% erucic acid with the remainder consisting of primarily chains having 18 carbon atoms. An alkali metal salt of erucic acid is also useful in some embodiments.

Some embodiments of the present invention use a fatty acid or its salt that is derived from an ester of a fatty acid. The alcohol residue constituting such ester may preferably contain 2 to 30 carbon atoms, and most preferably 6 to 20 carbon atoms. Such residue may be either a straight or a branched residue, and may also be a mixture of two or more residues each containing different number of carbon atoms. Exemplary such alcohol residues include residues of higher alcohols containing 10 to 20 carbon atoms such as cetyl alcohol, stearyl alcohol, and oleyl alcohol. Some embodiments use an ester wax of erucic acid.

In particular embodiments the salt of a fatty acid containing fewer than 25 carbon atoms is produced by neutralizing a fatty acid containing fewer than 25 carbon atoms or by saponification of an ester of a fatty acid containing fewer than 25 carbon atoms.

In other embodiments, the dispersing agent can be an ethylene acrylic acid copolymer. Still other embodiments use alkyl ether carboxylates as the dispersing agent. In some embodiments, petroleum sulfonates are useful. In other embodiments, the dispersing agent is a sulfonated or polyoxyethylenated alcohol. In still other embodiments, sulfated or phosphated polyoxyethylenated alcohols are suitable. Polymeric ethylene oxide/propylene oxide/ethylene oxide dispersing agents, known as poloxamers are used as the dispersing agent. Primary and secondary alcohol ethoxylates are also suitable in some dispersions. Alkyl glycosides and alkyl glycerides are used in some dispersions. Of course, combinations of these dispersing agents are also suitable.

Embodiments of the aqueous dispersions described herein contain water in addition to the components as described above. Deionized water is typically preferred. In some embodiments, water with excess hardness can undesirably affect the formation of a suitable dispersion. Particularly water containing high levels of alkaline earth ions, such as $Ca^{2+}$, should be avoided. The term "dispersion" as used herein refers to a finely divided solid or liquid in a continuous liquid medium. An aqueous dispersion is a dispersion in which the continuous liquid medium is water. The term "dispersion" as used herein in connection with the compositions of the invention is intended to include within its scope both emulsions of essentially liquid materials, prepared employing the thermoplastic resin and the dispersing agent, and dispersions of solid particles. Such solid dispersions can be obtained, for example, by preparing an emulsion as previously described, and then causing the emulsion particle to solidify by various means. Thus, when the components are combined, some embodiments provide an aqueous dispersion wherein content of the dispersing agent is present in the range of from 0.5 to 30 parts by weight, and content of (C) water is in the range of 1 to 35% by weight per 100 parts by weight of the thermoplastic polymer; and total content of (A) and (B) is in the range of from 65 to 99% by weight. In particular embodiments, the dispersing agent ranges from 2 to 20 parts by weight based on 100 parts by weight of the polymer. In some embodiments, the amount of dispersing agent is less than about 4 percent by wt., based on the weight of the thermoplastic polymer. In some embodiments, the dispersing agent comprises from about 0.5 percent by wt. to about 3 percent by weight, based on the amount of the thermoplastic polymer used. In other embodiments, about 1.0 to about 3.0 weight percent of the dispersing agent are used. Embodiments having less than about 4 weight percent dispersing agent are preferred where the dispersing agent is a carboxylic acid.

One feature of some embodiments of the invention is that the dispersions have a small particle size. Typically the average particle size is less than about 5 μm. Some preferred dispersions have an average particle size of less than about 1.5 μm. In some embodiments, the upper limit on the average particle size is about 4.5 μm, 4.0 μm, 3.5 μm, 3.75 μm, 3.5 μm, 3.0 μm, 2.5 μm, 2.0 μm, 1.5 μm, 1.0 μm, 0.5 μm, or 0.1 μm. Some embodiments have a lower limit on the average particle size of about 0.05, 0.7 μm, 0.1 μm, 0.5 μm, 1.0 μm, 1.5 μm, 2.0 μm, or 2.5 μm. Thus, some particular embodiments have, for example, an average particle size of from about 0.05 μm to about 1.5 μm. While in other embodiments, the particles in the dispersion have an average particle size of from about 0.5 μm to about 1.5 μm. For particles that are not spherical the diameter of the particle is the average of the long and short axes of the particle. Particle sizes can be measured on a Coulter LS230 light-scattering particle size analyzer or other suitable device.

Another parameter that characterizes particles in the dispersions is the particle size distribution, defined herein as the volume average particle diameter (Dv) divided by number average particle diameter (Dn). Some embodiments are characterized by a particle size distribution of less than or equal to about 2.0. In other embodiments, the dispersions have a particle size distribution of less than or equal to about less than 1.9, 1.7, or 1.5.

In yet another particular embodiment the aqueous dispersion has a concentration of the solid content including (A) thermoplastic resin is in the range of from 10 to 70%. Another measure of solids content is by volume. In some embodiments, the dispersion has a percent solids of less than about 74% by volume. Other dispersions have a solids content of from about 5% to about 74% by volume. In some embodiments, the dispersions have a percent solids of less than about 70% by volume, less than about 65% by volume, or ranging from about 5% to about 50% by volume.

One feature of some of the dispersions described herein is the pH, which can affect the uses for which dispersions are suitable. Typically, the dispersions have a pH of less than 12. Preferably, the pH ranges from about 5 to about 11.5, preferably from about 7 to about 11, more preferably from about 9 to about 11. However, dispersions having a lower limit of the pH of about 5, about 6, about 7, about 8, about 9, about 10, or about 11 are contemplated. Dispersions having an upper limit on the pH of about 6, about 7, about 8, about 9, about 10, about 11, or about 12 are contemplated.

While any method may be used, one convenient way to prepare the dispersions described herein is by melt-kneading. Any melt kneading means known in the art may be used. In some embodiments a kneader, a Banbury mixer, single-screw extruder, or a multi-screw extruder is used. The melt kneading may be conducted under the conditions which are typically used for melt kneading the thermoplastic resin (A). A process for producing the dispersions in accordance with the present invention is not particularly limited. One preferred process, for example, is a process comprises melt-kneading the above-mentioned components according to U.S. Pat. No. 5,756,659 and U.S. Patent Application No. 20010011118. A preferred melt-kneading machine is, for example, a multi screw extruder having two or more screws, to which a kneading block can be added at any position of the screws. If desired, it is allowable that the extruder is provided with a first material-supplying inlet and a second material-supplying inlet, and further third and forth material-supplying inlets in this order from the upper stream to the down stream along the flow direction of a material to be kneaded. Further, if desired, a vacuum vent may be added at an optional position of the extruder. In some embodiments, the dispersion is first diluted to contain about 1 to about 3% by weight of water and then subsequently further diluted to comprise greater than 25% by weight of water. In some embodiments, the further dilution provides a dispersion with at least about 30% by weight of water. The aqueous dispersion obtained by the melt kneading may be further supplemented with an aqueous dispersion of an ethylene-vinyl compound copolymer, or a dispersing agent.

FIG. 1 schematically illustrates such an extrusion apparatus embodiments of the invention. An extruder, in certain embodiments a twin screw extruder, 20 is coupled to a back pressure regulator, melt pump, or gear pump, 30. Embodiments also provide a base reservoir 40 and an initial water reservoir 50, each of which includes a pump (not shown). Desired amounts of base and initial water are provided from the base reservoir 40 and the initial water reservoir 50, respectively. Any suitable pump may be used, but in some embodiments a pump that provides a flow of about 150 cc/min at a pressure of 240 bar is used to provide the base and the initial water to the extruder 20. In other embodiments, a liquid injection pump provides a flow of 300 cc/min at 200 bar or 600 cc/min at 133 bar. In some embodiments the base and initial water are preheated in a preheater.

Resin in the form of pellets, powder or flakes is fed from the feeder 80 to an inlet 90 of the extruder 20 where the resin is melted or compounded. In some embodiments, the dispersing agent is added to the resin through an opening along with the resin and in other embodiments, the dispersing agent is provided separately to the twin screw extruder 20. The resin melt is then delivered from the mix and convey zone to an emulsification zone of the extruder where the initial amount of water and base from the reservoirs 40 and 50 is added through inlet 55. In some embodiments, dispersing agent may be added additionally or exclusively to the water stream. In some embodiments, the emulsified mixture is further diluted with additional water via inlet 95 from reservoir 60 in a dilution and cooling zone of the extruder 20. Typically, the dispersion is diluted to at least 30 weight percent water in the cooling zone. In addition, the diluted mixture may be diluted any number of times until the desired dilution level is achieved. In some embodiments, water is not added into the twin screw extruder 20 but rather to a stream containing the resin melt after the melt has exited from the extruder. In this manner, steam pressure build-up in the extruder 20 is eliminated.

In some embodiments a basic substance or aqueous solution, dispersion or slurry thereof is added to the dispersion at any point of the process, preferably to the extruder. Typically the basic substance is added as an aqueous solution. But in some embodiments, it is added in other convenient forms, such as pellets or granules. In some embodiments, the basic substance and water are added through separate inlets of the extruder. Examples of the basic substance which may be used for the neutralization or the saponification in the melt kneading process include alkaline metals and alkaline earth metals such as sodium, potassium, calcium, strontium, barium; inorganic amines such as hydroxylamine or hydrazine; organic amines such as methylamine, ethylamine, ethanolamine, cyclohexylamine, tetramethylammonium hydroxide; oxide, hydroxide, and hydride of alkaline metals and alkaline earth metals such as sodium oxide, sodium peroxide, potassium oxide, potassium peroxide, calcium oxide, strontium oxide, barium oxide, sodium hydroxide, potassium hydroxide, calcium hydroxide, strontium hydride, barium hydroxide, sodium hydride, potassium hydride, calcium hydride; and weak acid salts of alkaline metals and alkaline earth metals such as sodium carbonate, potassium carbonate, sodium hydrogencarbonate, potassium hydrogencarbonate, calcium hydrogencarbonate, sodium acetate, potassium acetate, calcium acetate; or ammonium hydroxide. In particular embodiments, the basic substance is a hydroxide of an alkaline metal or a hydroxide of an alkali metal. In some embodiments, the basic substance is selected from potassium hydroxide, sodium hydroxide and combinations thereof.

The aqueous dispersion may be coated onto a substrate by various procedures, and for example, by spray coating, curtain flow coating, coating with a roll coater or a gravure coater, brush coating, dipping. The coating is preferably dried by heating the coated substrate to 50 to 150° C. for 1 to 300 seconds although the drying may be accomplished by any suitable means.

The substrate for coatings may comprise a film of a thermoplastic resin such as polypropylene, polyethylene terephthalate, polyethylene, other polyolefins, oriented polyolefins, such as biaxially oriented polypropylene, polycarbonate, polyimide, polyamide, polyphenylene sulfide, polysulfone, aromatic polyester, polyether ether ketone, polyether sulfone, and polyether imide. The preferred substrate is a film comprising polyethylene terephthalate, polyethylene, polyamide, and/or polycarbonate, and the most preferred substrated is a film comprising polypropylene, and in particular, biaxially oriented polypropylene. Typically the films have a thickness in the range of from 0.5 to 50 microns, although some have a thickness of from 1 to 30 microns.

Some embodiments of the dispersions described herein are capable of forming a coating which exhibits excellent water resistance, oil resistance, or chemical resistance. Some embodiments exhibit adhesion to non-polar materials, and therefore, when the aqueous dispersion of the present invention is coated and dried on the surface of a substrate such as paper, fiber, wood, metal, or plastic molded article, the resulting resin coating will provide the substrate with water resistance, oil resistance, chemical resistance, corrosion resistance and heat sealability. Coatings obtained from some dispersions described herein exhibit excellent moisture resistance, water repellency, thermal adhesion to paper, especially for water and/or grease barrier and ink adhesion coatings layers, metal, glass, wood, fiber (natural fiber and synthetic fiber), and nonwoven fabric, thermal transfer properties, abrasion resistance, impact resistance, weatherability, solvent resistance, flexibility, and adaptability to high-frequency fabricating. Some dispersions are particularly suited for the formation of textile coatings including fabric impregnation. Some dispersions are also suitable for use as carpet backing layers. Coatings for architectural works are also contemplated as well as coatings for controlled release coatings on fertilizer pellets or as coatings to control surface properties such as coefficient of friction. Additionally some dispersions can be used to prepare stable froths and foams, as described in "Froths and Durable Foams of Dispersed Olefin Polymers and articles Prepared from Same" PCT Application Number 2004027593 filed Aug. 25, 2004.

Some aqueous dispersions described herein are used as a binder in a coating composition for a coated wall paper; a fiber coating agent (for improving the strength, moisture adsorption, or water repellency of the fiber); a net for construction, a sizing agent for nylon, polyester or glass fibers; a sizing agent/thermal adhesive of a paper or a nonwoven fabric; and an agent for imparting heat sealability with a paper or a film; a thermal adhesive of a sterilized paper; a binder of an ink or a coating composition; a surface coating agent for a paper or a film adapted for use with an ink jet printer; an agent for improving chipping resistance of an automotive coating composition; and the like.

In some embodiments, the aqueous dispersions have additional components in an amount that does not adversely affect the object of the present invention. Exemplary such additional components include water-soluble amino resins such as water-soluble melamine resin and water-soluble benzoguanamine resin and water-soluble epoxy resins for improving coating performance; organic thickeners such as polyvinyl alcohol, polyvinyl pyrrolidone, polyvinyl methylether, polyethylene oxide, polyacrylamide, polyacrylic acid, carboxy methyl cellulose, methyl cellulose, and hydroxyethyl cellulose and inorganic thickeners such as silicon dioxide, active clay, and bentonite for improving the stability and adjusting the viscosity of the dispersion; dispersing agents such as nonionic dispersing agents and anionic dispersing agents and water-soluble polyvalent metal salts for improving the stability of the dispersion; other additives such as anti-rust agent, anti-mold agent, UV absorber, thermal stabilizer, foaming agent, antifoaming agent, and the like; pigments such as titanium white, red iron oxide, phthalocyanine, carbon black, permanent yellow; and fillers such as calcium carbonate, magnesium carbonate, barium carbonate, talk, aluminum hydroxide, calcium sulfate, kaolin, mica, asbestos, mica, and calcium silicate.

EXAMPLES

Preparation Example 1

100 parts by weight of a thermoplastic ethylene-vinyl acetate commercially available from DuPont having a vinyl acetate content of about 28 wt %, a density of about 0.95 g/cm3 (ASTM D-792) and a melt index of about 6 g/10 min. (as determined according to ASTM D1238 at 190° C. and 2.16 kg), and a melting point of about 73° C. (as determined according to ASTM D3417) and 4.2 parts by weight of a $C_{32}$ carboxylic acid (Unicid 425 manufactured by Baker-Petrolite, acid value 97 mg KOH/g) are melt kneaded at 180° C. in twin screw extruder at a rate of 8.3 kg/hr.

Upon the melt kneaded resin/surfactant, 4.6 wt % aqueous solution of potassium hydroxide is continuously fed into a downstream injection port at a rate 0.9 kg/hr (at a rate of 10 wt % of the total mixture). This aqueous dispersion is subsequently diluted with additional water at a rate of 5.7 kg/hr before exiting the extruder. An aqueous dispersion having a solids content of 56 wt % at pH 10.7 is obtained. The dispersed polymer phase measured by a Coulter LS230 particle analyzer consisted of an average volume diameter of 0.56 micron and a particle size distribution (dv/dn) of 1.45. The term "dispersed polymer phase" simply refers to the thermoplastic resin in the dispersion.

Preparation Example 2

100 parts by weight of a thermoplastic ethylene/1-octene copolymer with an octene content of about 38 wt %, a density of about 0.87 g/cm3 (ASTM D-792) and a melt index of about 5 g/10 min. (as determined according to ASTM D1238 at 190° C. and 2.16 kg) a Mw/Mn of about 2.0, and a melting point of about 63° C. (as determined by DSC at a scanning rate of about 10° C. per minute), commercially available from DuPont Dow Elastomers, and 3.1 parts by weight of a C18/C16 carboxylic acid (Industrene 106 manufactured by CK Witco, acid value 200 mg KOH/g) are melt kneaded at 125° C. in twin screw extruder at a rate of 7.9 kg/hr.

Upon the melt kneaded resin/surfactant, 23.9 wt % aqueous solution of potassium hydroxide is continuously fed into a downstream injection port at a rate 0.2 kg/hr (at a rate of 2.5 wt % of the total mixture). This aqueous dispersion is subsequently diluted with additional water at a rate of 5.4 kg/hr before exiting the extruder. To further dilute the resulting dispersion, additional water is added at a rate of 0.7 kg/hr after the mixture exited the extruder. An aqueous dispersion having a solids content of 56 wt % at pH 9.6 is obtained. The dispersed polymer phase measured by a Coulter LS230 particle analyzer consisted of an average volume diameter of 2.04 micron and a particle size distribution (dv/dn) of 1.18.

Preparation Example 3

100 parts by weight of a thermoplastic ethylene/1-octene copolymer with octene content of about 38 wt %, a density of about 0.87 g/cm3 (ASTM D-792) and a melt index of about 5 g/10 min. (as determined according to ASTM D1238 at 190° C. and 2.16 kg) a Mw/Mn of about 2.0, and a melting point of about 63° C. (as determined by DSC at a scanning rate of about 10° C. per minute.), commercially available from DuPont Dow Elastomers, and 3.6 parts by weight of a C22/C18 carboxylic acid (High-erucic rapeseed oil manufactured by Montana Specialty Mills, acid value 97 mg KOH/g) are melt kneaded at 150° C. in twin screw extruder at a rate of 5.0 kg/hr.

Upon the melt kneaded resin/surfactant, 16.3 wt % aqueous solution of potassium hydroxide is continuously fed into a downstream injection port at a rate 0.1 kg/hr (at a rate of 2.0 wt % of the total mixture). This aqueous dispersion is subsequently diluted with additional water at a rate of 3.2 kg/hr before exiting the extruder. To further dilute the resulting dispersion, additional water is added at a rate of 0.8 kg/hr after the mixture exited the extruder. An aqueous dispersion having a solids content of 55 wt % at pH 10.7 is obtained. The dispersed polymer phase measured by a Coulter LS230 particle analyzer consisted of an average volume diameter of 1.11 micron and a particle size distribution (dv/dn) of 1.85.

Preparation Example 4

100 parts by weight of a thermoplastic ethylene/1-octene copolymer with octene content of about 38 wt %, a density of about 0.87 g/cm3 (ASTM D-792) and a melt index of about 5 g/10 min. (as determined according to ASTM D1238 at 190° C. and 2.16 kg) a Mw/Mn of about 2.0, and a melting point of about 63° C. (as determined by DSC at a scanning rate of about 10° C. per minute.), commercially available from DuPont Dow Elastomers and 3.1 parts by weight of a C26 carboxylic acid (Unicid 350 manufactured by Baker-Petrolite, acid value 115 mg KOH/g) are melt kneaded at 150° C. in twin screw extruder at a rate of 9.7 kg/hr.

Upon the melt kneaded resin/surfactant, 12.5 wt % aqueous solution of potassium hydroxide is continuously fed into a downstream injection port at a rate 0.2 kg/hr (at a rate of 2.0 wt % of the total mixture). This aqueous dispersion is subsequently diluted with additional water at a rate of 7.5 kg/hr before exiting the extruder. An aqueous dispersion having a solids content of 56 wt % at pH 10.8 is obtained. The dispersed polymer phase measured by a Coulter LS230 particle analyzer consisted of an average volume diameter of 0.79 micron and a particle size distribution (dv/dn) of 1.95.

Preparation Example 5

100 parts by weight of a thermoplastic propylene-ethylene copolymer with an ethylene content of about 12.7 wt %, a density of about 0.864 g/cm3 (ASTM D-792) and a melt flow rate of about 23 g/10 min. (as determined according to ASTM D1238 at 230° C. and 2.16 kg), a melting point of 60-70° C., a Mw/Mn of about 2.0, and a flexural modulus of about 4 kpsi, and 6.4 parts by weight of a C26 carboxylic acid (Unicid 350 manufactured by Baker-Petrolite, acid value 115 mg KOH/g) are melt kneaded at 150° C. in twin screw extruder at a rate of 1.6 kg/hr.

Upon the melt kneaded resin/surfactant, 25 wt. % aqueous solution of potassium hydroxide is continuously fed into a downstream injection port at a rate 0.08 kg/hr (at a rate of 4.8 wt % of the total mixture). This aqueous dispersion is subsequently diluted with additional water at a rate of 1.5 kg/hr before exiting the extruder. An aqueous dispersion having a solids content of 51 wt % at pH 11.6 is obtained. The dispersed polymer phase measured by a Coulter LS230 particle analyzer consisted of an average volume diameter of 0.61 micron and a particle size distribution (dv/dn) of 1.31.

Preparation Example 6

100 parts by weight of a thermoplastic propylene-ethylene copolymer with comonomer content of about 9 wt %, a melting point of 86° C., a melt flow rate of about 25 g/10 min. (as determined according to ASTM D1238 at 230° C. and 2.16 kg), and a Mw/Mn of about 2.0, and 42.9 parts by weight of an ethylene acrylic acid copolymer, available from The Dow Chemical Company under the tradename PRIMACOR™ 5980i, with a melt index of about 15 g/10 min determined according to ASTM D1238 at 125° C./2.16 kg (which is equivalent to about 300 g/10 min when determined according to ASTM D1238 at 190° C./2.16 kg), an acrylic acid content of about 20.5 wt. %, and a DSC melting point of about 77° C. are melt kneaded at 170° C. in twin screw extruder at a rate of 4.3 kg/hr.

Upon the melt kneaded resin/surfactant, 11.7 wt. % aqueous solution of potassium hydroxide is continuously fed into a downstream injection port at a rate 1.6 kg/hr (at a rate of 27.1 wt % of the total mixture). This aqueous dispersion is subsequently diluted with additional water at a rate of 2.7 kg/hr before exiting the extruder. To further dilute the resulting dispersion, additional water is added at a rate of 2.3 kg/hr after the mixture exited the extruder. An aqueous dispersion having a solids content of 41 wt % at pH 9.9 is obtained. The dispersed polymer phase measured by a Coulter LS230 particle analyzer consisted of an average volume diameter of 0.86 micron and a particle size distribution (dv/dn) of 1.48.

As demonstrated above, embodiments of the invention provide new methods for making a coated substrate by applying and drying dispersions on the substrate, and those coated substrates are useful for many applications. In some instances, the new methods make the coatings using dispersions that have one or more of the following advantages. First, some new coatings made from the dispersions have better durability. Certain coatings made from the dispersions exhibit improved adhesion properties and others may have improved adhesion as well as good toughness and durability. Other coatings made from the dispersions are easier to process in a melt-extrusion process. In particular, some coatings made from the dispersions are easier to process due to the low melting point of the polymers deposited from the dispersions. Some coatings made from the dispersions have the feature of being low yellowing. Other characteristics and additional advantages are apparent to those skilled in the art.

As discussed above, aqueous dispersions made in accordance with embodiments described herein may be particularly useful in creating coatings for various substrates. Exemplary substrates include, but are not limited to, polypropylene, polyethylene terephthalate, polyethylene, other polyolefins, oriented polyolefins, such as biaxially oriented polypropylene (BOPP), polycarbonate, polyimide, polyamide, polyphenylene sulfide, polysulfone, aromatic polyester, polyether ether ketone, polyether sulfone, and polyether imide.

Figure 2:
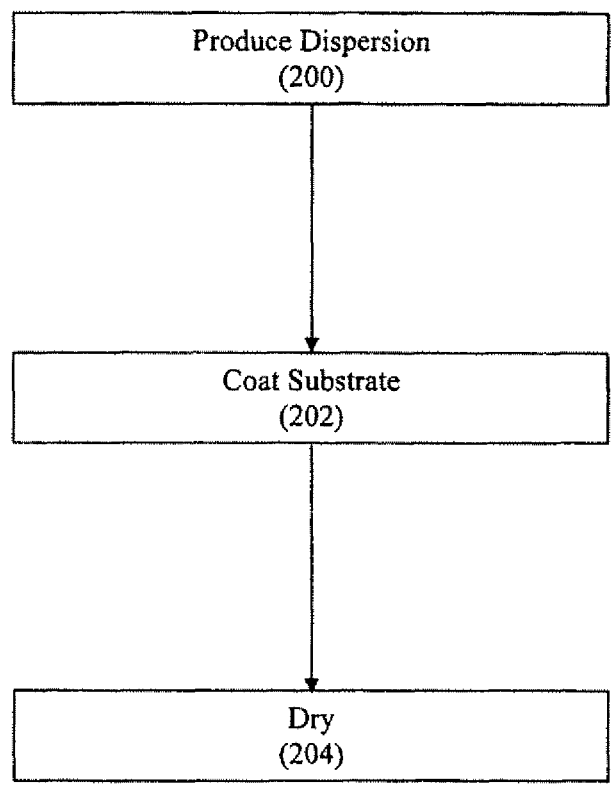
FIG. 2 is a flowchart showing a method in accordance with an embodiment of the present invention.

After drying, the resultant film may be useful in a number of applications. FIG. 2 is a flowchart describing one embodiment of the present invention. As shown in FIG. 2, the first step in the process is to produce an aqueous polymer dispersion (step 200). The next step (step 202) is to coat a substrate with the dispersion. The coated substrate is then dried to form the final product (step 204). Each of the steps will be explained in more detail below.

Forming the Dispersion (Step 200)

This step is discussed in detail in the paragraphs above. However, some discussion is provided below for the sake of clarity. In forming the dispersion, it is important to note that the resin(s) that provide the basis for the dispersion is a significant element and controls or modifies at least the following characteristics:

Heat seal behavior—heat seal initiation temperature, seal strength, and hot tack; Adhesion to base film substrate; and Film formation characteristics—during the drying of the dispersion, the particles preferably would coalesce to form a coherent, transparent layer.

Polymers that may be used in embodiments of the invention include AFFINITY™ EG 8200 co-polymer (0.870 g/cc, 5 MI) and/or DE 4300.02 a propylene based copolymer (12% ethylene, 25 MFR), both of which are available from The Dow Chemical Company, Midland, Mich. Both polymers provide a low heat seal initiation temperature, good adhesion to substrates, and can form a film when dried.

In other embodiments, a copolymer of propylene, ethylene and, optionally, one or more unsaturated comonomers, e.g., $C_{4-20}$ α-olefins, $C_{4-20}$ dienes, vinyl aromatic compounds (e.g., styrene), etc may be used. These copolymers are characterized as comprising at least about 60 weight percent (wt %) of units derived from propylene, about 0.1-35 wt % of units derived from ethylene, and 0 to about 35 wt % of units derived from one or more unsaturated comonomers, with the proviso that the combined weight percent of units derived from ethylene and the unsaturated comonomer does not exceed about 40. These copolymers are also characterized as having at least one of the following properties: (i) $^{13}C$ NMR peaks corresponding to a regio-error at about 14.6 and about 15.7 ppm, the peaks of about equal intensity, (ii) a skewness index, $S_{ix}$, greater than about −1.20, (iii) a DSC curve with a $T_{me}$ that remains essentially the same and a $T_{max}$ that decreases as the amount of comonomer, i.e., the units derived from ethylene and/or the unsaturated comonomer(s), in the copolymer is increased.

In other embodiments, a copolymer of propylene and one or more unsaturated comonomers may be used. These copolymers are characterized in having at least about 60 wt % of the units derived from propylene, and between about 0.1 and 40 wt % the units derived from the unsaturated comonomer. These copolymers are also characterized as having at least one of the following properties: (i) $^{13}C$ NMR peaks corresponding to a regio-error at about 14.6 and about 15.7 ppm, the peaks of about equal intensity, (ii) a skewness index, $S_{ix}$, greater than about −1.20, (iii) a DSC curve with a $T_{me}$ that remains essentially the same and a $T_{max}$ that decreases as the amount of comonomer, i.e., the units derived from the unsaturated comonomer(s), in the copolymer is increased.

In other embodiments, a blend of two or more copolymers, in which at least one copolymer is at least one of the propylene/ethylene and propylene/unsaturated comonomer copolymers described above (individually and collectively "P/E*copolymer"), may be used. The amount of each component in the blend can vary to convenience. The blend may contain any weight percent, based on the total weight of the blend, of either component, and the blend may be either homo- or heterophasic. If the latter, the copolymer of the first or second embodiment of this invention can be either the continuous or discontinuous (i.e., dispersed) phase.

In other embodiments, the invention relates to a blend of (a) at least one propylene homopolymer, and (b) at least one other polymer, e.g. an EP or EPDM rubber. The propylene homopolymer is characterized as having $^{13}C$ NMR peaks corresponding to a regio-error at about 14.6 and about 15.7 ppm, the peaks of about equal intensity. Preferably, the propylene homopolymer is characterized as having substantially isotactic propylene sequences, i.e., the sequences have an isotactic triad (mm) measured by $^{13}C$ NMR of greater than about 0.85.

The at least one other polymer of (b) may be a polyolefin such as one or more of a polyethylene, ethylene/α-olefin, butylene/α-olefin, ethylene/styrene and the like. The blend may contain any weight percent, based on the total weight of the blend, of either component, and the blend may be either homo- or heterophasic. If the latter, the propylene homopolymer can be either the continuous or dispersed phase.

Methods for forming these types of polymers are disclosed in U.S. Published Patent Application No. 20030204017, which is expressly incorporated by reference in its entirety.

Further, as discussed in the dispersion section above, a surfactant (or mixture of surfactants) may be used to stabilize the dispersion. By judiciously selecting the surfactant or surfactants, it is possible to control or modify at least some of the following characteristics:
Dispersion particle size;
Film formation characteristics;
Shear and shelf stability—the ability of the dispersion to withstand high shear (shear stability) and extended time (shelf stability) without a significant change in dispersion properties (e.g., particle size);
Wettability—the ability to flow onto a substrate without "drawing back" or "beading" on the substrate; and
Adhesion to a Substrate.

As noted above, the surfactant may be a single surfactant or a blend of several surfactants. The surfactant selected should be able to initially disperse the desired polymer or polymer solution. Selected surfactants that are effective for this include long chain fatty acids (C18 through C32) neutralized via a base (typically NaOH, KOH, and NH$_4$OH). One particular example of this type is oleic acid neutralized via KOH. Other surfactants include ethylene-acrylic acid copolymers neutralized via a base. One example is PRIMACOR™ 59801 copolymer (20 wt % acrylic acid, 300 MI, available from The Dow Chemical Company, Midland, Mich.) neutralized via KOH. Another group of useful surfactants includes sulfonic acid salts. One example is Rhodocal™ DS-10 surfactant (available from Rhodia, Inc. Cranbury, N.J.).

In addition to the surfactant used to initially disperse the polymer, additional surfactants can be added to improve characteristics such as wettability and shear stability. Sulfonic acid salts have proven to be effective in this capacity.

One specific example of a surfactant package for the polyolefin dispersion includes long chain fatty acids from C12 to C60 in an amount from 0 to 10% by weight based on polymer, ethylene-acrylic acid (EAA) in an amount from 0 to 50% by weight based on polymer, and sulfonic acid salts in an amount from 0 to 10% by weight based on polymer, wherein the total surfactant loading is less than about 50% by weight based on polymer. In other embodiments, the total surfactant loading may be less than about 10% by weight based on polymer. In other embodiments, the total surfactant loading may be less than about 5% based on polymer. In specific embodiments, neutralization of the long chain fatty acids and the EAA is by addition of a base in an amount ranging from 25 to 200% on a molar basis.

In another embodiment, a surfactant package for the polyolefin dispersion includes long chain fatty acids from C12 to C40 in an amount from 0 to 5% by weight based on polymer, ethylene-acrylic acid in an amount from 0 to 30% by weight based on polymer, and sulfonic acid salts in an amount from 0 to 5% by weight based on polymer, wherein the total surfactant loading is 1.0% by weight based on polymer. In specific embodiments, neutralization of the long chain fatty acids and the EAA is by addition of a base from 50 to 150% on a molar basis.

In another embodiment, a surfactant package for the polyolefin dispersion includes long chain fatty acids from C18 to C30 in an amount from 2 to 4% by weight based on polymer, and sulfonic acid salts in an amount from 1 to 3% by weight based on polymer. In selected embodiments, neutralization of the long chain fatty acids and the EAA is by addition of a base from 75 to 125% on a molar basis.

Another feature of dispersions in accordance with the invention that may be controlled in order to provide useful coatings on substrates includes controlling dispersion particle size. In selected embodiments, the average particle size (based on volume fraction) of the dispersion may be less than 1 micron to achieve a transparent film at the low coating thicknesses desired (1 to 2 micron dry coating thickness).

However, other particle sizes may be useful depending on the particular application selected. In some embodiments, the particle size of the dispersion may be <5 micron. In selected embodiments, the particle size of a dispersion may be <2 micron, and, in certain embodiments, the particle size of a dispersion may be <1 micron.

Another aspect of a dispersion in accordance with the invention that may be controlled is the solids content. A proper range of solids content of a dispersion may prevent separation of the dispersed polymer particles from the water and/or reduce the cost of transportation as less water accompanies the polymer. In selected embodiments, the solids content of the dispersion may be greater than 50% solids by weight. In some embodiments, the solids content of the dispersion is from 10 to 70% solids by weight. In other embodiments, the solids content of the dispersion is from 20 to 60% solids by weight, and in other embodiments, the solids content of the dispersion is from 40 to 55% solids by weight.

Another aspect of dispersions in accordance with the invention that may be controlled is the shear stability. The process of coating a dispersion onto a film substrate at low thickness often requires exposure of the dispersion to very high shear rates. In preferred embodiments, the dispersion is able to withstand this exposure without appreciable coagulation. In certain embodiments, it is desirable to have less than 0.5 g of polymer coagulate based on a 100 g dispersion sample exposed to the high shear.

Also, the overall pH of a dispersion may be significant in controlling the wettability and adhesion of the dispersion onto the desired film substrate. For low surface energy substrates such as biaxially oriented polypropylene (BOPP), the pH of the dispersion is preferably less than 11. In some embodiments, the pH of the dispersion is from 7.5 to 13. In other embodiments, the pH of the dispersion is from 8 to 12, and in other embodiments, the pH of the dispersion is from 8 to 11.

Coating Application Conditions (Step 202)

After the dispersion has been produced, it is coated on to a substrate. With respect to the coating thickness, the thickness of the applied coating is important in controlling the hot tack and seal strength of the finished film. A coating thickness of 1 to 2 microns is typically needed to generate a seal strength >200 g/in., which is a suitable strength for a packaging application. Preferred thickness for the dried coating is from 0.5 to 75 microns. In certain embodiments, a coating thickness for the dried coating is from 0.5 to 25 microns. In other embodiments, a coating thickness for the dried coating is from 0.75 to 5, or from 0.75 to 2, microns.

Typical resins that may be used include the following resins alone and in blends: ethylene homopolymers such as LDPE, ethylene-vinyl compounds such as ethylene-vinyl acetate (EVA) and ethylene-methyl acrylate (EMA), ethylene-alpha olefin copolymers such as ethylene-butene, ethylene-hexene, and ethylene-octene copolymers, propylene homopolymers, and propylene copolymers and interpolymers such as propylene-ethylene copolymers and propylene-ethylene-butene interpolymers.

More preferred polymers as coatings on BOPP and other polyolefin substrates include ethylene-octene copolymers having a density between 0.85 and 0.90 g/cc and melt index (ASTM D-1238 190° C. with 2.16 kg weight) from 0.1 to 100 g/10 min. Propylene-ethylene copolymers having an ethylene content between 5 and 20% by weight and a melt flow rate (ASTM D-1238 230° C. with 2.16 kg weight) from 0.5 to 300 g/10 min. More preferably polymers as coatings on BOPP and other polyolefin substrates include ethylene-octene copolymers having a density between 0.86 and 0.88 g/cc and melt index (ASTM D-1238 190° C. with 2.16 kg weight) from 0.8 to 35 g/10 min. In other embodiments, propylene-ethylene copolymers having an ethylene content between 9 and 15% by weight and a melt flow rate (ASTM D-1238 230° C. with 2.16 kg weight) from 1 to 30 g/10 min are used.

Embodiments of the present invention are particularly suited for use with oriented substrates. "Solid state orientation" herein refers to the orientation process carried out at a temperature higher than the highest Tg (glass transition temperature) of resins making up the majority of the structure and lower than the highest melting point, of at least some of the film resins, that is at a temperature at which at least some of the resins making up the structure are not in the molten state. Solid state orientation may be contrasted to "melt state orientation" that is including hot blown films, in which stretching takes place immediately upon emergence of the molten polymer film from the extrusion die.

"Solid state oriented" herein refers to films obtained by either coextrusion or extrusion coating of the resins of the different layers to obtain a primary thick sheet or tube (primary tape) that is quickly cooled to a solid state to stop or slow crystallization of the polymers, thereby providing a solid primary film sheet, and then reheating the solid primary film sheet to the so-called orientation temperature, and thereafter biaxially stretching the reheated film sheet at the orientation process (for example a trapped bubble method) or using a simultaneous or sequential tenter frame process, and finally rapidly cooling the stretched film to provide a heat shrinkable film. In the trapped bubble solid state orientation process the primary tape is stretched in the transverse direction (TD) by inflation with air pressure to produce a bubble, as well as in the longitudinal direction (LD) by the differential speed between the two sets of nip rolls that contain the bubble. In the tenter frame process the sheet or primary tape is stretched in the longitudinal direction by accelerating the sheet forward, while simultaneously or sequentially stretching in the transverse direction by guiding the heat softened sheet through a diverging geometry frame.

When referring to the average volume diameter of a thermoplastic resin in a dispersion, or a dispersion having an average volume diameter particle size, one of ordinary skill in the art will recognize that other materials such as filler may also be present in the dispersed particles, and would be included in the diameter size. When measuring the average volume diameter all the dispersed solids are included.

Substrates such as film and film structures particularly benefit from the novel coating methods and coating compositions described herein and those substrates can be made using conventional hot blown film fabrication techniques or other biaxial orientation processes such as tenter frames or double bubble processes. Conventional hot blown film processes are described, for example, in The Encyclopedia of Chemical Technology, Kirk-Othmer, Third Edition, John Wiley & amp; Sons, New York, 1981, Vol. 16, pp. 416-417 and Vol. 18, pp. 191-192. Biaxial orientation film manufacturing process such as described in a "double bubble" process as in U.S. Pat. No. 3,456,044 (Pahlke), and the processes described in U.S. Pat. No. 4,352,849 (Mueller), U.S. Pat. No. 4,597,920 (Golilce), U.S. Pat. No. 4,820,557 (Warren), U.S. Pat. No. 4,837,084 (Warren), U.S. Pat. No. 4,865,902 (Golike et al.), U.S. Pat. No. 4,927,708 (Henan et al.), U.S. Pat. No. 4,952,451 (Mueller), U.S. Pat. No. 4,963,419 (Lustig et al.), and U.S. Pat. No. 5,059,481 (Lustig et al.), can also be used to make substrates for coating by the novel coating methods and coating compositions described herein. The substrate film structures can also be made as described in a tenterframe technique, such as that used for oriented polypropylene.

Other multi-layer film manufacturing techniques for food packaging applications are described in Packaging Foods With Plastics, by Wilmer A. Jenkins and James P. Harrington (1991), pp. 19-27, and in "Coextrusion Basics" by Thomas I. Butler, Film Extrusion Manual: Process, Materials, Properties pp. 31-80 (published by TAPPI Press (1992)).

The substrate films may be monolayer or multilayer films. The substrate film to be coated can also be coextruded with other layer(s) or the film can be laminated onto another layer (s) in a secondary operation to form the substrate to be coated, such as that described in Packaging Foods With Plastics, by Wilmer A. Jenkins and James P. Harrington (1991) or that described in "Coextrusion For Barrier Packaging" by W. J. Schrenk and C. R. Finch, Society of Plastics Engineers RETEC Proceedings, June 15-17 (1981), pp. 211-229. If a monolayer substrate film is produced via tubular film (that is, blown film techniques) or flat die (that is, cast film) as described by K. R. Osborn and W. A. Jenkins in "Plastic Films, Technology and Packaging Applications" (Technomic Publishing Co., Inc. (1992)), then the film must go through an additional post-extrusion step of adhesive or extrusion lamination to other packaging material layers to form a multilayer structure to be used as the substrate. If the substrate film is a coextrusion of two or more layers (also described by Osborn and Jenkins), the film may still be laminated to additional layers of packaging materials, depending on the other physical requirements of the final film.

"Laminations Vs. Coextrusion" by D. Dumbleton (Converting Magazine (September 1992)), also discusses lamination versus coextrusion. Monolayer and coextruded films can also go through other post extrusion techniques, such as a biaxial orientation process.

Extrusion coating is yet another technique for producing multilayer film structures as substrates to be coated using the novel coating methods and coating compositions described herein. The novel coating compositions comprise at least one layer of the coated film structure. Similar to cast film, extrusion coating is a flat die technique.

The films and film layers of this invention are useful in vertical or horizontal-form-fill-seal (HFFS or VFFS) applications. Relevant patents describing these applications include U.S. Pat. No. 5,228,531; U.S. Pat. No. 5,360,648; U.S. Pat. No. 5,364,486; U.S. Pat. No. 5,721,025; U.S. Pat. No. 5,879,768; U.S. Pat. No. 5,942,579; U.S. Pat. No. 6,117,465.

Generally for a multilayer film structure, the novel coating methods apply the coating compositions to the substrate in order to form at least one layer of the total multilayer film structure. Other layers of the multilayer structure may include but are not limited to barrier layers, and/or tie layers, and/or structural layers.

Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terephthalate (PET), polypropylene, oriented polypropylene (OPP), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (for example, maleic anhydride grafted polyethylene), and paper. Generally, the multilayer film structures comprise from 2 to 7 layers.

Substrate films can be made by cast extrusion (for monolayer films) or coextrusion (for multilayer films) by techniques well known in the art. The films can be quenched, irradiated by electron beam irradiation at a dosage of between 20 and 35 kiloGrays, and reheated to their orientation temperature, and then oriented at a ratio of up to 1.5:1, or up to 2:1, or up to 3:1, or up to 4:1, or up to 5:1 in each of the longitudinal (also called machine-direction) and transverse (also called cross-direction) directions. In one embodiment, the orientation is about 5:1 in the traverse direction and about 10:1 in the longitudinal direction. In another embodiment the orientation is about 7:1 in each of the longitudinal and transverse directions.

The substrate films can be made by any suitable process, including coextrusion, lamination, extrusion coating, or corona bonding and can be made by tubular cast coextrusion, such as that shown in U.S. Pat. No. 4,551,380 (Schoenberg). Bags made from the film can be made by any suitable process, such as that shown in U.S. Pat. No. 3,741,253 (Brax et al.). Side or end sealed bags can be made from single wound or double wound films.

Substrate films can be oriented by any suitable process, including a trapped bubble process or a simultaneous or sequential tenterframe process. Films can have any total thickness desired, so long as the film provides the desired properties for the particular packaging operation in which the films is used. Final film thicknesses can vary, depending on process, end use application, etc. Typical thicknesses range from 0.1 to 20 mils, preferably 0.2 to 15 mils, more preferably 0.3 to 10 mils, more preferably 0.3 to 5 mils, more preferably 0.3 to 2 mils, such as 0.3 to 1 mil.

Suitable thermoplastic polymer materials include, but are not limited to, polyesters, polycarbonates, polyarylates, polyamides, polyimides, polyamide-imides, polyetheramides, polyetherimides, polyaryl ethers, polyarylether ketones, aliphatic polyketones, polyphenylene sulfide, polysulfones, polystyrenes and their derivatives, polyacrylates, polymethacrylates, cellulose derivatives, polyethylenes, polypropylene (preferably homopolymers), other polyolefins, copolymers having a predominant olefin monomer, fluorinated polymers and copolymers, chlorinated polymers, polyacrylonitrile, polyvinylacetate, polyvinylalcohol, polyethers, ionomeric resins, elastomers, silicone resins, epoxy resins, and polyurethanes. Miscible or immiscible polymer blends comprising any of the above-named polymers, and copolymers comprising any of the constituent monomers of any of the above-named polymers, are also suitable, provided an oriented film may be produced from such a blend or copolymer.

As used herein the term "copolymer" and "interpolymer" are used interchangeably, to mean polymers formed from two or more monomers.

While reference to specific thermoplastic resins have been made, embodiments of the present invention may be generally used with any suitable thermoplastic resin. In addition, while reference has been made to single layers, it is expressly within the scope of the present invention that multiple layers may be used. Thus, combinations of layers such as those described herein may be used. In addition, however, it is expressly within the scope of the present invention that other layers which may be formed from other materials may be overlayed or interposed between layers formed from the dispersions disclosed herein.

Drying Conditions (Step 204)

Once the dispersion is coated onto the desired substrate, the coating is dried to remove the water and to coalesce the polymer particles into a substantially continuous film. In one embodiment, an oven may be used to accelerate the drying process. To properly coalesce the polymer particles, the coating is preferably allowed to reach a temperature approximately 20° C. above the melting point of the polymer from which the dispersion is produced. As an example, in the case of a dispersion produced from AFFINITY™ EG 8200 co-polymer (60° C. melting point as determined by DSC at a scanning rate of about 10° C. per minute), the coated film should reach a temperature of about 80° C.

In selected embodiments, the temperature range used ranges from the peak melting point of the polymer base of the dispersion to the softening point of the base film. In certain embodiments, the coated substrate may exit the drying oven at a temperature from 10° C. above the peak melting point of the polymer base of the dispersion to 10° C. below the softening point of the base film. In other embodiments the substrate may exit the drying oven at a temperature from 20° C. above the peak melting point of the polymer base of the dispersion to 20° C. below the softening point of the base film.

Example 1

In one embodiment, a sample of AFFINITY™ EG-8200 co-polymer is dispersed, using the method described in U.S. Pat. No. 5,539,021 (Pate), which is hereby incorporated by reference in its entirety, using 4 wt % Rhodacal™ DS-10 surfactant as an emulsifier and toluene as a solvent. After vacuum stripping, the resultant dispersion has an average volume diameter of 0.80 μm at 46.0% solids loading.

Figure 3:
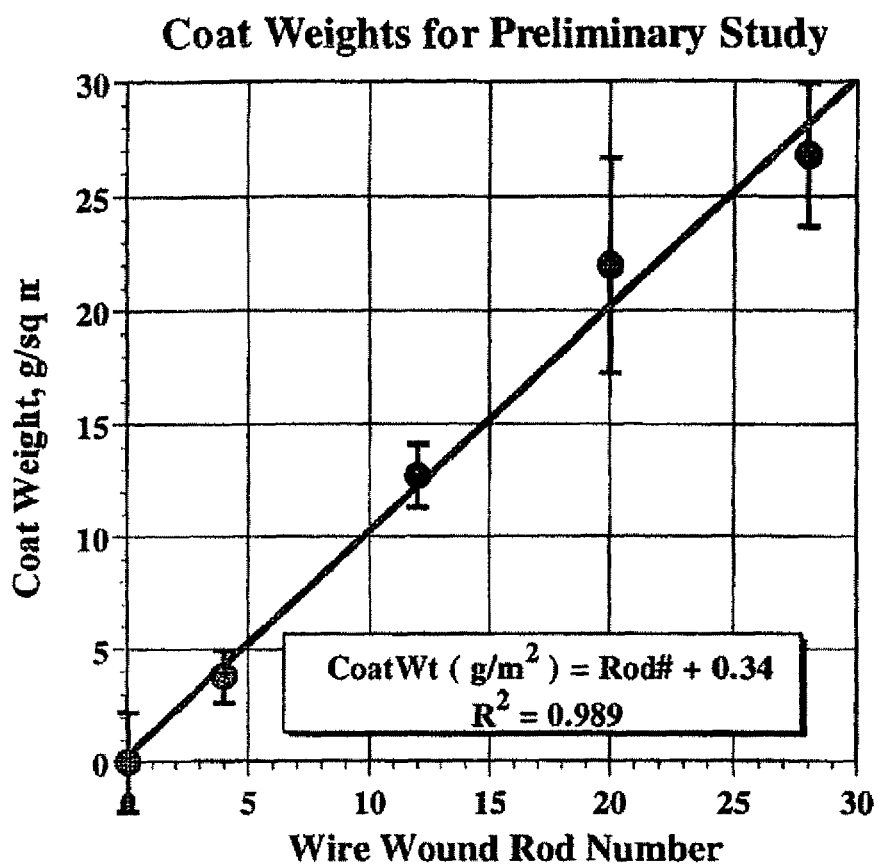
FIG. 3 shows a graph of coat weights.

An untreated (i.e., no corona treatment) LLDPE film made from DOWLEX™ 2071 polyethylene (available from The Dow Chemical Company, Midland, Mich.) of 2 mils (50.8 microns) thickness is cut into 12 inch by 6 inch sheets. Each of the sheets is taped to a sheet of glass and coated using wire-round rods (rod #'s 4, 12, 20, and 28). Table 1 below and FIG. 3 show the coat weights of the various samples.

TABLE 1

Coating Weight and Thickness of Dispersion Coated LDPE Film Samples

| Rod# | Gross Wt. g/m² | Std Dev. g/m² | Coat Wt. g/m² | Coat Thickness mils | Coat Thickness μm |
|---|---|---|---|---|---|
| Control | 45.18 | 2.22 | 0.00 | 0.00 | 0.00 |
| 4 | 49.00 | 1.16 | 3.82 | 0.17 | 4.32 |
| 12 | 57.91 | 1.41 | 12.74 | 0.58 | 14.73 |
| 20 | 67.19 | 4.69 | 22.02 | 1.00 | 25.40 |
| 28 | 72.01 | 3.12 | 26.83 | 1.21 | 30.73 |

For each coated weight, individual strips (1 inch wide) having no backing are heat sealed at 45, 50, 55, 60, 65, 70, 75, and 80° C., respectively, using a Packforsk Hot Tack Tester set at 40 psi seal pressure and 0.5 second dwell time. Sealed samples are allowed to equilibrate for at least a day in a room set at 70° F. (21.1° C.) and 50% relative humidity before being pulled on Instron model 4501 tensile testing device. For this experiment, a seal is declared a "weld" if the seal force is greater than the force (4 lbs (1.8 kg)) required to irreversibly elongate and re-orient the crystal structure within the 2 mls (50.8 microns) thick LLDPE films. Results of the experiment are shown below in Table 2 and FIG. 4.

As used herein, the temperature at which a seal strength of 0.5 lb/in is achieved is known as the heat seal initiation temperature. The heat seal initiation temperature for the coatings in this example set is from 45° C. to 60° C., depending on the coating weight.

TABLE 2

Peel Strength for Ethylene-Octene Copolymer Dispersion Coated LDPE Films

| Seal Temp, ° C. | Mean Peak Peel Strength, lb/in | | | |
|---|---|---|---|---|
| 45 | 0.075 | 0.020 | 0.098 | 0.118 |
| 50 | 0.178 | 0.201 | 0.380 | 0.554 |
| 55 | 0.463 | 0.530 | 0.352 | 1.365 |
| 60 | 1.048 | 1.477 | 2.124 | 3.456 |
| 65 | 1.144 | 2.267 | 3.755 | 3.196 |
| 70 | 1.155 | 3.204 | 3.510 | >4 |
| 75 | 1.129 | 3.081 | 3.815 | >4 |
| 80 | — | 1.439 | >4 | >4 |
| Coating Wt., g/m² | 3.82 | 12.7 | 22.0 | 26.8 |

The metric equivalents for the above table is provided below:

Peel Strength for Ethylene-Octene Copolymer Dispersion Coated LDPE Films

| Seal Temp, ° C. | Mean Peak Peel Strength, g/cm | | | |
|---|---|---|---|---|
| 45 | 13 | 4 | 18 | 21 |
| 50 | 32 | 36 | 68 | 99 |
| 55 | 83 | 95 | 63 | 244 |
| 60 | 187 | 264 | 380 | 618 |
| 65 | 204 | 405 | 671 | 571 |
| 70 | 206 | 573 | 627 | >700 |
| 75 | 202 | 551 | 682 | >700 |
| 80 | — | 257 | >700 | >700 |
| Coating Wt., g/m² | 3.82 | 12.7 | 22.0 | 26.8 |

Example 2

A sample of propylene-ethylene co-polymer (ethylene content of 12% by weight with a melt flow rate of about 25 g/10 min as determined according to ASTM D1238 at 230° C. with a 2.16 kg weight) is converted to an aqueous dispersion using a technique as described in co-pending U.S. application Ser. No. 10/925,693. 100 parts by weight of the propylene-ethylene co-polymer and 3.1 parts by weight of a C26 carboxylic acid (Unicid 350 manufactured by Baker-Petrolite, acid value 115 mg KOH/g) is melt kneaded at 150° C. in twin screw extruder at a rate of 6.6 kg/hr.

To the melt kneaded resin/surfactant blend, a 13.5 wt % aqueous solution of potassium hydroxide is continuously fed into a downstream injection port at a rate 0.17 kg/hr (which equates to 2.5 wt % of the total mixture). This aqueous dispersion is subsequently diluted in a two step process with water containing 5.0 wt % dioctyl sodium sulfosuccinate (Aerosol OT-100 manufactured by Cytec Industries) at a rate of 3.7 kg/hr, and secondly additional water added at a rate of 1.1 kg/hr before exiting the extruder. To further dilute the resulting dispersion, additional water is added at a rate of 1.8 kg/hr after the mixture exited the extruder. An aqueous dispersion having a solids content of 51 wt % at pH 10.2 is obtained. The dispersed polymer phase measured by a Coulter LS230 particle analyzer consisted of an average volume diameter of 0.64 micron and a particle size distribution (dv/dn) of 1.33.

While the polymers discussed here provide good low temperature heat seal initiation properties, other polymers may also be included in the dispersion to improve other properties. For example, a very low or ultra low density polyethylene, a linear low density polyethylene or high density polyethylene could be included in the dispersion to improve other properties. If the oriented substrate is nylon, it may be advantageous to include a functionalized polymer such as ethylene acrylic acid or a maleic anyhydride grafted polypropylene. Similarly, if the oriented substrate is polyester, other functionalized polymers such as ethylene vinyl acetate copolymers or ethylene ethyl acrylate copolymers may be advantageous to include in the dispersion.

A corona treated BOPP (BICOR LBW made by Mobil Chemical Corporation) of 1.2 mils is cut into 12 inch by 14 inch sheets. Each of the sheets is taped to a flat foamed plastic board and the dispersion described above is coated onto the BOPP (the side without a slip additive) using wire-round rods (rod #'s 4, 12, and 18). The purpose of the foamed plastic board is to achieve a more consistent coating thickness.

Coated sheets are placed into a convection oven at 135° C. for 5 minutes to dry the dispersion coating. The resulting coating thickness is determined gravimetrically. Ten pieces (1-inch by 1-inch) of coated film samples are weighed individually and the coating thickness is determined by subtracting the weight of the base BOPP substrate. A density of 0.864 g/cc is used for calculating the coating thickness based on the weight difference.

TABLE 3

Coating Weight and Thickness of Dispersion Coated BOPP Film Samples

| Rod# | Gross Wt. g/m² | Std Dev. g/m² | Coat Wt. g/m² | Coat Thickness mils | Coat Thickness μm |
|---|---|---|---|---|---|
| Control | 27.75 | 2.84 | 0.00 | 0.00 | 0.00 |
| 4 | 30.85 | 2.36 | 3.10 | 0.14 | 3.59 |
| 12 | 40.46 | 1.54 | 12.71 | 0.58 | 14.71 |
| 18 | 45.57 | 2.75 | 17.83 | 0.81 | 20.64 |

For each coated weight, individual strips (1 inch wide) having no backing are heat sealed from 50 to 140° C. in 10° C. increments, using a Packforsk Hot Tack Tester set at 40 psi seal pressure and 0.5 second dwell time. Sealed samples are allowed to equilibrate for at least a day in an ASTM room set at 70° F. (21.1° C.) and 50% relative humidity before being pulled on Instron model 4501 tensile testing device at a rate of 10 inches per minute. Results of the experiment are shown below.

As used herein, the temperature at which a seal strength of 0.5 lb/in is achieved is defined as the heat seal initiation temperature. The heat seal initiation temperature for the coatings in this example set is from approximately 56° C. to 76° C., depending on the coating weight.

TABLE 4

Peel Strength for Propylene-Ethylene Copolymer Dispersion Coated BOPP Films

| Seal Temp, ° C. | Mean Peak Peel Strength, lb/in | | |
|---|---|---|---|
| 50 | 0.000 | 0.308 | 0.000 |
| 60 | 0.000 | 0.768 | 0.152 |
| 70 | 0.228 | 2.290 | 0.618 |
| 80 | 0.626 | 2.524 | 2.083 |
| 90 | 0.840 | 2.322 | 2.200 |
| 100 | 0.878 | 2.332 | 2.502 |
| 120 | 0.784 | 1.980 | 2.814 |
| 130 | 0.922 | 2.272 | 2.758 |
| 140 | 0.933 | 2.580 | 2.840 |
| Coating Wt., g/m$^2$ | 3.59 | 14.71 | 20.64 |

Metric equivalents of the above table are provided below:

Peel Strength for Propylene-Ethylene Copolymer Dispersion Coated BOPP Films

| Seal Temp, ° C. | Mean Peak Peel Strength, g/cm | | |
|---|---|---|---|
| 50 | 0 | 55 | 0 |
| 60 | 0 | 137 | 27 |
| 70 | 41 | 409 | 110 |
| 80 | 112 | 451 | 372 |
| 90 | 150 | 415 | 393 |
| 100 | 157 | 417 | 447 |
| 120 | 140 | 354 | 503 |
| 130 | 165 | 406 | 493 |
| 140 | 167 | 461 | 508 |
| Coating Wt., g/m$^2$ | 3.59 | 14.71 | 20.64 |

Thus, dispersions in accordance with embodiments of the present invention may be used to coat substrates. In particular, embodiments of the present invention provide a film (obtained from the coated substrate), which may have a heat seal initiation temperature of between about 45° C. and 90° C. In other embodiments the heat seal initiation temperatures may range from 65° C. to 80° C., 70° C. to 75° C., or 70° C. to 80° C. Those of ordinary skill in the art will recognize that other values within the range may be included.

In selected embodiments, the propylene copolymer may be selected to deliver the desired performance properties. For example, the heat seal initiation temperature and the heat seal range will be a function of the propylene copolymer selected. Copolymers with higher comonomer content will generally have lower heat seal initiation temperatures.

Those of ordinary skill in the art will also recognize that embodiments of the present invention may be applied in a non-uniform, or localized manner depending on the application. For example, a coating may be applied only to a portion (e.g., a strip or band at one end) of a substrate that is needed to be sealed.

While the polymers discussed here provide good low temperature heat seal initiation properties, other polymers may also be included in the dispersion to improve other properties. For example, a small amount of a homopolymer polypropylene or a random copolymer polypropylene may be added to the dispersion to improve heat resistance or to extend hot tack strength at higher temperatures. If the oriented substrate is nylon, it may be advantageous to include a functionalized polymer such as ethylene acrylic acid or a maleic anyhydride grafted polypropylene. Similarly, if the oriented substrate is polyester, other functionalized polymers such as ethylene vinyl acetate copolymers or ethylene ethyl acrylate copolymers may be advantageous to include in the dispersion.

Advantageously, one or more embodiments of the present invention, provide heat sealable films that may allow for higher packaging line speeds (due to lower heat seal initiation temperatures), provide the ability to seal packages over broad operating windows, and provide good package integrity.

In other words, one or more embodiments of the present invention provide the ability to seal packages over a broad operating window. During startup and shutdown of packaging lines, the temperature of the sealing equipment can often deviate, sometimes by a large amount, from the setpoint. With a packaging film having a low heat seal initiation temperature, an adequate seal can still be generated if the sealing equipment is somewhat cooler than desired.

While the invention has been described with respect to a limited number of embodiments, the specific features of one embodiment should not be attributed to other embodiments of the invention. No single embodiment is representative of all aspects of the inventions. Moreover, variations and modifications therefrom exist. For example, the dispersions described herein may comprise other components. Various additives may also be used to further enhance one or more properties. In some embodiments, the dispersions are substantially free of any additive not specifically enumerated herein. Some embodiments of the dispersions described herein consist of or consist essentially of the enumerated components. In addition, some embodiments of the methods described herein consist of or consist essentially of the enumerated steps. The appended claims intend to cover all such variations and modifications as falling within the scope of the invention.

What is claimed is:

1. An aqueous dispersion comprising: (A) at least one thermoplastic resin, wherein the thermoplastic resin comprises an interpolymer of ethylene with at least one comonomer selected from the group consisting of a $C_4$-$C_{20}$ linear, branched or cyclic dime, vinyl acetate, and a compound represented by the formula $H_2C\!\!=\!\!CHR$ wherein R is a $C_2$-$C_{20}$ linear, branched or cyclic alkyl group or a $C_6$-$C_{20}$ aryl group; (B) at least one dispersing agent; and (C) water; wherein the dispersion had a pH in the range of 8 to 11.

2. The aqueous dispersion of claim 1 wherein the thermoplastic resin has a density between 0.85 and 0.90 g/cc.

\* \* \* \* \*